(12) United States Patent
Wagner et al.

(10) Patent No.: US 8,256,060 B2
(45) Date of Patent: Sep. 4, 2012

(54) APPARATUS FOR CLEANING EXHAUST AFTERTREATMENT DEVICES AND METHODS

(75) Inventors: Wayne M. Wagner, Apple Valley, MN (US); Mary Joanne Lorenzen, Chanhassen, MN (US); John T. Herman, Rhinelander, WI (US)

(73) Assignee: Donaldson Company, Inc., Minneapolis, MN (US)

( * ) Notice: Subject to any disclaimer, the term of this patent is extended or adjusted under 35 U.S.C. 154(b) by 1194 days.

(21) Appl. No.: 12/022,578

(22) Filed: Jan. 30, 2008

(65) Prior Publication Data

US 2008/0178413 A1     Jul. 31, 2008

Related U.S. Application Data

(60) Provisional application No. 60/898,553, filed on Jan. 30, 2007.

(51) Int. Cl.
*B01D 46/00* (2006.01)
(52) U.S. Cl. ............... 15/319; 15/304; 15/406; 15/339; 55/301; 55/304; 95/279; 95/280; 95/283
(58) Field of Classification Search ............... 15/304, 15/338, 406, 339, 319; 55/301, 304; 95/279, 95/280, 283; *B01D 46/00*
See application file for complete search history.

(56) References Cited

U.S. PATENT DOCUMENTS

| | | |
|---|---|---|
| 729,516 A | 5/1903 | Steilberg |
| 1,170,807 A | 2/1916 | Egan |
| 3,421,295 A | 1/1969 | Swift et al. |
| 3,693,884 A | 9/1972 | Snodgrass et al. |
| 3,989,471 A | 11/1976 | Nowak |
| 4,157,899 A | 6/1979 | Wheaton |
| 4,159,197 A | 6/1979 | Schuler et al. |
| 4,171,963 A | 10/1979 | Schuler |
| 4,174,204 A | 11/1979 | Chase |
| 4,359,864 A | 11/1982 | Bailey |
| 4,395,269 A | 7/1983 | Schuler |
| 4,452,616 A | 6/1984 | Gillingham et al. |
| 4,504,293 A | 3/1985 | Gillingham et al. |
| 4,509,960 A | 4/1985 | Engel |
| 4,549,715 A | 10/1985 | Engel |
| 4,558,565 A | 12/1985 | Kojima et al. |
| 4,836,834 A | 6/1989 | Steele |
| 4,851,015 A | 7/1989 | Wagner et al. |

(Continued)

FOREIGN PATENT DOCUMENTS

EP     1 060 780 A1     12/2000

(Continued)

OTHER PUBLICATIONS

Invitation to Pay Additional Fees with Partial International Search mailed Aug. 28, 2008.

(Continued)

*Primary Examiner* — David Redding
(74) *Attorney, Agent, or Firm* — Merchant & Gould P.C.

(57) ABSTRACT

The present disclosure relates to a pulse cleaner for cleaning a diesel exhaust aftertreatment device. The pulse cleaner includes a cabinet, a diesel exhaust aftertreatment device mount positioned within the cabinet for mounting the diesel exhaust aftertreatment device during pulse cleaning, and a collection filter positioned within the cabinet for collecting material displaced from the diesel exhaust aftertreatment device during cleaning. The pulse cleaner can be equipped with features such as an exhaust aftertreatment device core temperature sensor, an air flow concentrator or an air swirling vane. The pulse cleaner can also include adapters for providing system compatibility with different styles of exhaust aftertreatment devices.

9 Claims, 28 Drawing Sheets

U.S. PATENT DOCUMENTS

| | | | |
|---|---|---|---|
| 4,867,768 A | 9/1989 | Wagner et al. |
| 4,878,928 A | 11/1989 | Wagner et al. |
| 4,899,540 A | 2/1990 | Wagner et al. |
| 5,008,086 A | 4/1991 | Merry |
| 5,013,340 A | 5/1991 | Taslim et al. |
| 5,053,603 A | 10/1991 | Wagner et al. |
| 5,065,574 A | 11/1991 | Bailey |
| 5,101,095 A | 3/1992 | Wagner et al. |
| 5,212,948 A | 5/1993 | Gillingham et al. |
| 5,240,485 A | 8/1993 | Haerle et al. |
| 5,250,094 A | 10/1993 | Chung et al. |
| 5,253,476 A | 10/1993 | Levendis et al. |
| 5,293,742 A | 3/1994 | Gillingham et al. |
| 5,347,809 A | 9/1994 | Moeckel et al. |
| 5,357,755 A | 10/1994 | Gillingham et al. |
| 5,388,400 A | 2/1995 | Hoppenstedt et al. |
| 5,390,492 A | 2/1995 | Levendis |
| 5,397,550 A | 3/1995 | Marino, Jr. |
| 5,400,590 A | 3/1995 | Wagner et al. |
| 5,426,936 A | 6/1995 | Levendis et al. |
| 5,458,673 A | 10/1995 | Kojima et al. |
| 5,520,366 A | 5/1996 | Elliott |
| 5,551,971 A | 9/1996 | Chadderton et al. |
| 5,566,545 A | 10/1996 | Hijikata et al. |
| 5,595,581 A | 1/1997 | Ichikawa et al. |
| 5,611,831 A | 3/1997 | Matsuoka et al. |
| 5,616,171 A | 4/1997 | Barris et al. |
| 5,634,952 A | 6/1997 | Kasai et al. |
| 5,683,479 A | 11/1997 | Gillingham et al. |
| 5,762,783 A | 6/1998 | Harvey |
| 5,809,777 A | 9/1998 | Kawamura |
| 5,833,725 A | 11/1998 | Dehn et al. |
| 5,928,395 A | 7/1999 | Glen et al. |
| 5,953,817 A | 9/1999 | Watanabe et al. |
| 6,129,852 A | 10/2000 | Elliott et al. |
| 6,149,716 A | 11/2000 | Bach et al. |
| 6,233,926 B1 | 5/2001 | Bailey et al. |
| 6,442,864 B2 | 9/2002 | Ringer et al. |
| 6,471,918 B1 | 10/2002 | Sherwood |
| 6,526,753 B1 | 3/2003 | Bailey |
| 6,565,630 B2 | 5/2003 | Ohno et al. |
| 6,641,646 B2 | 11/2003 | Rosenberg |
| 6,726,884 B1 | 4/2004 | Dillon et al. |
| 6,770,116 B2 | 8/2004 | Kojima |
| 6,815,038 B2 | 11/2004 | Morimoto et al. |
| 6,862,881 B1 | 3/2005 | Klingbeil et al. |
| 6,902,592 B2 | 6/2005 | Green et al. |
| 6,981,370 B2 | 1/2006 | Opris et al. |
| 6,989,045 B2 | 1/2006 | Bailey et al. |
| 7,015,158 B2 | 3/2006 | Pearce et al. |
| 7,025,811 B2 | 4/2006 | Streichsbier et al. |
| 7,055,314 B2 | 6/2006 | Treiber |
| 7,108,739 B2 | 9/2006 | Iyer et al. |
| 7,168,243 B2 | 1/2007 | Endicott et al. |
| 7,171,801 B2 | 2/2007 | Verkiel et al. |
| 7,314,501 B2 | 1/2008 | Fayard |
| 7,357,829 B2 | 4/2008 | Ehlers |
| 7,371,266 B2 | 5/2008 | Streichsbier et al. |
| 7,384,455 B2 | 6/2008 | Sellers et al. |
| 7,410,521 B2 | 8/2008 | Sellers et al. |
| 7,410,529 B2 | 8/2008 | Sellers et al. |
| 7,410,530 B2 | 8/2008 | Wagner et al. |
| 7,419,532 B2 | 9/2008 | Sellers et al. |
| 7,426,924 B2 | 9/2008 | Withrow et al. |
| 7,458,207 B2 | 12/2008 | Ehlers |
| 7,462,222 B2 | 12/2008 | Sellers et al. |
| 7,468,085 B2 | 12/2008 | Goddard |
| 7,473,288 B2 | 1/2009 | Toyoda et al. |
| 7,481,048 B2 | 1/2009 | Harmon et al. |
| 7,550,119 B2 | 6/2009 | Kojima |
| 7,582,141 B2 | 9/2009 | Ehlers |
| 7,716,922 B2 | 5/2010 | Ehlers |
| 7,762,062 B2 | 7/2010 | Opris |
| 7,770,386 B2 | 8/2010 | Lowe et al. |
| 2004/0035094 A1 | 2/2004 | Jersey |
| 2004/0226287 A1 | 11/2004 | Edgar et al. |
| 2006/0059877 A1 | 3/2006 | Toshida |
| 2006/0070360 A1 | 4/2006 | Sellers et al. |
| 2006/0191412 A1 | 8/2006 | Sellers et al. |
| 2006/0201326 A1 | 9/2006 | Wagner et al. |
| 2007/0119146 A1 | 5/2007 | Callas et al. |
| 2009/0044523 A1 | 2/2009 | Wagner et al. |
| 2010/0037423 A1 | 2/2010 | Herman |

FOREIGN PATENT DOCUMENTS

| | | |
|---|---|---|
| EP | 1 252 919 A1 | 10/2002 |
| EP | 1 369 161 A1 | 12/2003 |
| FR | 2 815 884 A1 | 5/2002 |
| JP | 2004-239072 | 8/2004 |
| WO | WO 93/03262 | 2/1993 |
| WO | WO 95/23280 | 8/1995 |
| WO | WO 98/18540 | 5/1998 |
| WO | WO 2006/096244 A1 | 9/2006 |

OTHER PUBLICATIONS

Berg, T., "Are You Ready for January '07 Engines?," *Construction Equipment*, 7 pages (Oct. 1, 2006).

Brochure, "Diesel Particulate Filter Mufflers," *Donaldson Company, Inc.*, Brochure No. F111129, 4 pages (Nov. 2004).

Brochure, "Environmental Control Booth Models ECB-2, ECB-3, & ECB-4," *Donaldson Company, Inc.*, 2 pages (Date Unknown).

Brochure, "Heavy-Duty Diesel Engine DPF Pulse Cleaner," *Donaldson Company, Inc.* 4 pages (Copyright 2006).

Brochure, "CombiClean™ Diesel Particulate Filter Cleaning Station," *Lubrizol Engine Control Systems*, 3 pages (Mar. 2003).

Brochure, "Dalamatic® Dust Collectors,"*Donaldson Company, Inc.*, 12 pages (2002).

"Diesel Particulate Filter Maintenance: Current Practices and Experience," *Manufacturers of Emission Controls Association*, pp. 1-19 (Dec. 2004).

"Mobile Cleaning Unit for Diesel Particulate Filters," *Product and Service Bulletin from Dinex Exhausts Ltd.*, 6 pages (Nov. 2001).

Brochure, "RF Baghouse Dust Collectors," *Donaldson Company, Inc.*, 12 pages (2005).

"RF Dust Collectors. Models 48RF8-484RF12," *Donaldson Company, Inc.*, 4 pages (1994).

"Tool News. New Product Information," *Caterpillar*, 2 pages (Dec. 1, 2007).

Cleaire Product Catalog: Horizon™, http://www.cleaire.com/site/products/horizon.html, 7 Pages (May 10, 2006).

International Preliminary Report on Patentability cited in cited in PCT/US2008/052431 mailed Aug. 4, 2009.

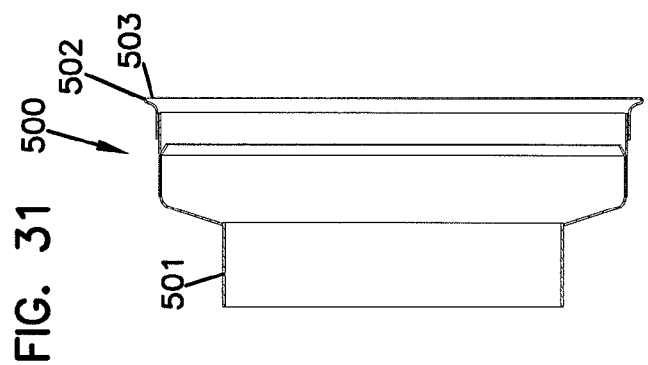
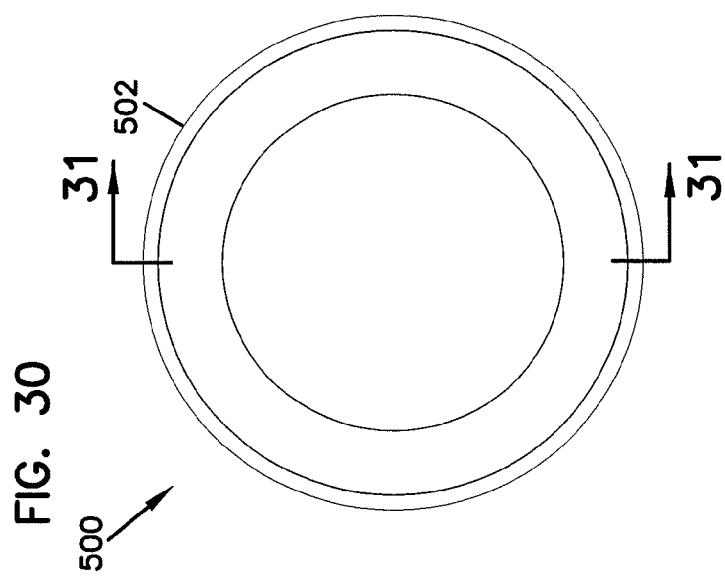
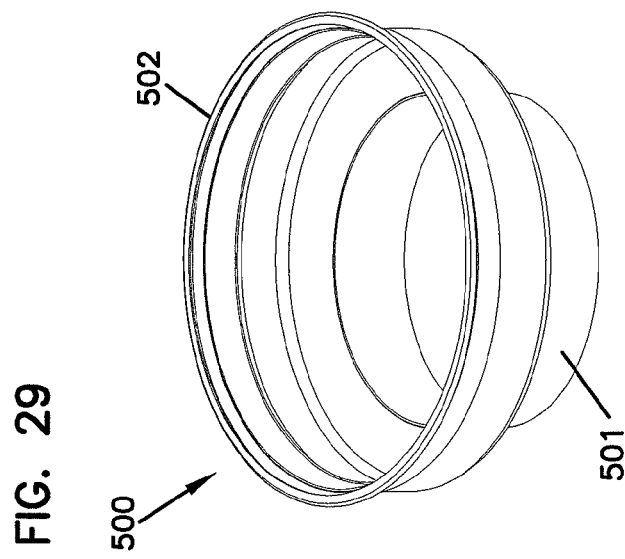

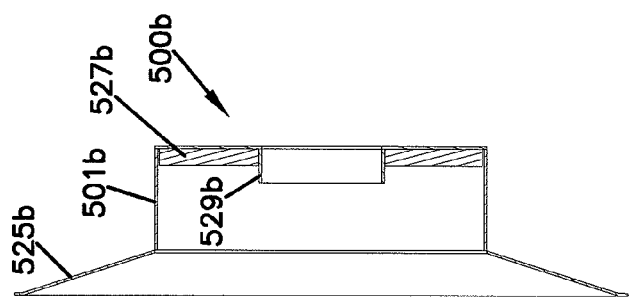
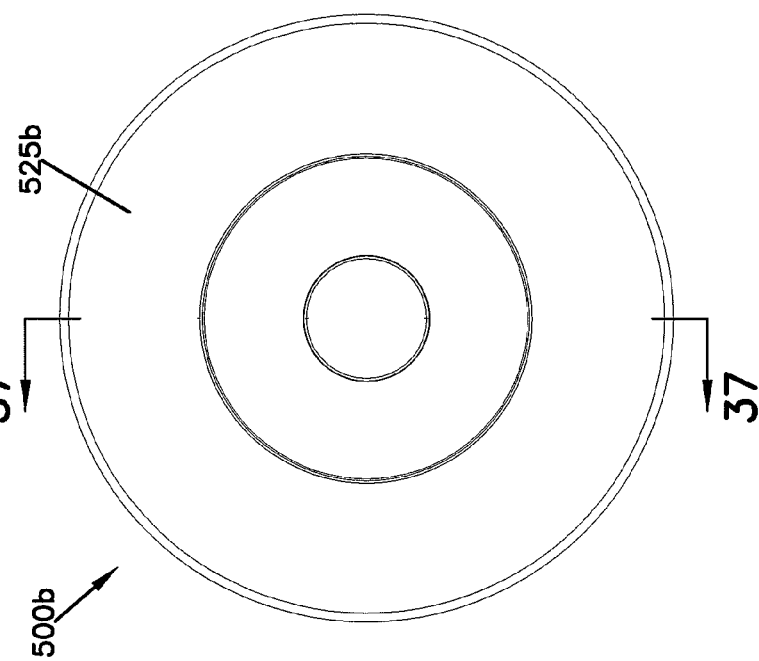
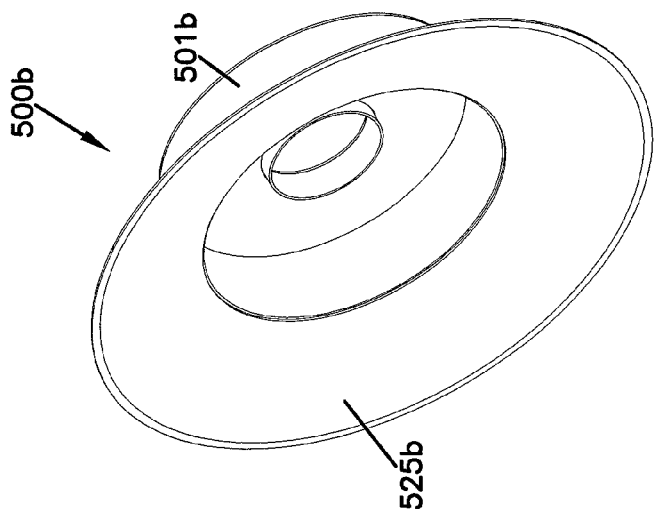

US 8,256,060 B2

APPARATUS FOR CLEANING EXHAUST AFTERTREATMENT DEVICES AND METHODS

CROSS-REFERENCE TO RELATED APPLICATION

This application claims the benefit of U.S. Provisional Patent Application Ser. No. 60/898,553 filed Jan. 30, 2007, which application is hereby incorporated by reference in its entirety.

TECHNICAL FIELD

The present invention relates generally to devices and methods for servicing/cleaning diesel particulate filters or other exhaust aftertreatment devices.

BACKGROUND

To reduce air pollution, engine exhaust emissions standards have become increasingly more stringent. Aftertreatment devices have been developed to satisfy these increasingly stringent standards. For example, catalytic converters have been used to reduce the concentration of pollutant gases (e.g., hydrocarbons, carbon monoxide, nitric oxide, etc.) exhausted by engines. With respect to diesel engines, diesel particulate filters have been used to reduce the concentration of particulate matter (e.g., soot) in the exhaust stream. U.S. Pat. No. 4,851,015, which is hereby incorporated by reference, discloses an example diesel particulate filter. Other example types of aftertreatment devices include lean NOx catalyst devices, selective catalytic reduction (SCR) catalyst devices, lean NOx traps, or other device for removing for removing pollutants from engine exhaust streams.

At times, it is required to service aftertreatment devices. To facilitate servicing, aftertreatment devices are often clamped into an exhaust system as modules or separate units. For example, clamps can be provided at flange interfaces located opposite adjacent opposite ends of the aftertreatment devices. By removing the end clamps, a given aftertreatment device can be removed from its corresponding exhaust system for servicing.

In use, aftertreatment devices occasionally become overloaded with soot, ash or other materials present in or generated from engine exhaust. As aftertreatment devices become overloaded, the devices cause undesirable backpressure in their corresponding exhaust systems. Before an aftertreatment device becomes plugged to the point where excessive backpressure is a concern, it is recommended to remove the device from its corresponding exhaust system for servicing. To service a device such as a diesel particulate filter, it is known to manually move a focused stream of pressurized air back and forth across the outlet side of the filter to loosen soot/ash that has collected on the filter. For example, a dry air gun (e.g., 50-100 psi) can be used as a source of pressurized air. Simultaneously, an industrial vacuum device is coupled to the inlet side of the filter. The vacuum device is typically equipped with a high-efficiency particulate air filter or ultra-low penetration air filter for collecting the soot/ash that is blown from the filter by the pressurized air. Total time for cleaning the filter depends on the size of the filter, but is typically 30-50 minutes.

Pulse cleaners have been used in other filtration applications to clean filters. For example, industrial dust collection systems have been designed with "self-cleaning" filters for removing dust from an air stream (e.g., see U.S. Pat. No. 4,159,197). These systems have filters (e.g., pleated filters or bag filters) that are cleaned in situ (i.e., on-line). For example, while the systems are in use collecting dust, the systems periodically use nozzles to direct pulses of air at the filters in a reverse-flow direction (i.e., in a direction opposite to the flow of air being filtered) to drive or shake collected dust from the filters.

What is needed is an improved device/method for servicing overloaded diesel particulate filters or other exhaust aftertreatment devices.

SUMMARY

Certain aspects of the present disclosure relate to devices and methods for efficiently and effectively cleaning diesel particulate filters or other exhaust aftertreatment devices.

One aspect of the present disclosure relates to an exhaust aftertreatment device cleaning system that blows air through the exhaust aftertreatment device to clean the device. The cleaning system can include a temperature sensing system for determining if the exhaust aftertreatment device has a temperature that exceeds a predetermined temperature level. The cleaning system can also include air flow deflectors that cause the air to swirl before reaching the exhaust aftertreatment device. The cleaning system can further include an air flow concentrator that focuses air flow at specific locations of the exhaust aftertreatment device. The cleaning system can also include a plurality of adapters for allowing the cleaning system to be compatible with different styles of exhaust aftertreatment devices.

Examples representative of a variety of inventive aspects are set forth in the description that follows. The inventive aspects relate to individual features as well as combinations of features. It is to be understood that both the forgoing general description and the following detailed description merely provide examples of how the inventive aspects may be put into practice, and are not intended to limit the broad spirit and scope of the inventive aspects.

BRIEF DESCRIPTION OF THE DRAWINGS

FIG. 29 is a perspective view of an exhaust treatment device mounting adapter having inventive aspects in accordance with the principles of the present disclosure;

FIG. 30 is a plan view of the adapter of FIG. 29;

FIG. 31 is a cross-sectional view taken along section line 31-31 of FIG. 30;

FIG. 35 is a perspective view of a further exhaust treatment device mounting adapter having inventive aspects in accordance with the principles of the present disclosure;

FIG. 36 is a plan view of the adapter of FIG. 35;

FIG. 37 is a cross-sectional view taken along section line 37-37 of FIG. 36.

DETAILED DESCRIPTION

Figure 1:
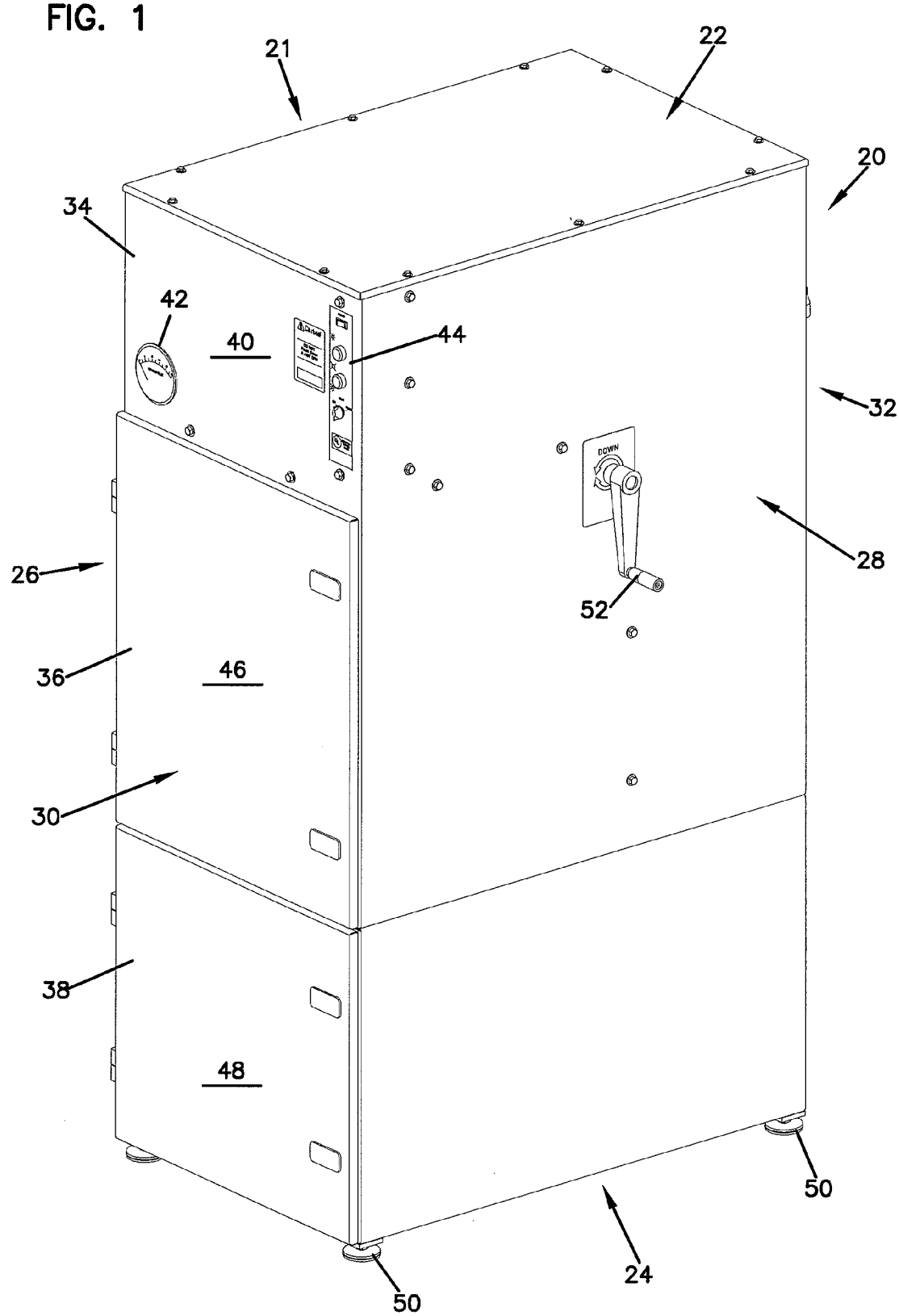
FIG. 1 is a perspective view of an aftertreatment device cleaner having features that are examples of inventive aspects in accordance with the principles of the present disclosure.

In the following detailed description, references are made to the accompanying drawings that depict various embodiments which are examples of how certain inventive aspects may be practiced. It is to be understood that other embodiments may be utilized, and structural and functional changes may be made without departing from the broad scope of the inventive aspects.

The present disclosure relates to methods and systems for efficiently and effectively cleaning diesel particulate filters (DPF) or other exhaust aftertreatment devices. In one embodiment, relatively high volume pulses of relatively low-pressure compressed air are used to back flush collected material (e.g., soot, ash or other material captured from engine exhaust) from exhaust aftertreatment devices. In certain embodiments, each pulse is directed at majority of the cross-sectional area of the outlet face of a given exhaust aftertreatment device being cleaned. In other embodiments, the pulses can be focused at certain areas/regions of the outlet face of a given exhaust aftertreatment device being cleaned.

Throughout the remainder of the specification, cleaning devices and methods are described primarily with respect to cleaning diesel particulate filters. However, it will be appreciated that the same devices and methods can be used to clean other types of engine exhaust aftertreatment devices as well. Other example aftertreatment devices that may require servicing include catalytic converters, lean NOx catalyst devices, selective catalytic reduction (SCR) catalyst devices, lean NOx traps, or other devices for removing for removing pollutants from the exhaust stream. The methods and cleaners can also be used to clean other types of filters/treatment devices, and are not limited exclusively to engine exhaust aftertreatment devices.

Diesel particulate filter substrates can have a variety of known configurations. An exemplary configuration includes a monolith ceramic substrate having a "honey-comb" configuration of plugged passages as described in U.S. Pat. No. 4,851,015 that is hereby incorporated by reference in its entirety. This type of filter can be referred to as a wall-flow trap or filter. Common materials used for wall-flow filters include silicon carbide and cordierite. Wire mesh, corrugated metal foil and other flow-through type filter configurations can also be used. In certain embodiments, the filter substrate can include a catalyst. Exemplary catalysts include precious metals such as platinum, palladium and rhodium, and other types of components such as base metals or zeolites.

As described herein, aftertreatment devices are described as having inlet sides or faces and outlet sides or faces. The inlet side or face of an aftertreatment device is the side that faces the incoming flow of exhaust when installed in an exhaust system. The inlet side can be referred to as the "dirty" side since it is the side at which material filtered from the exhaust stream collects. The outlet side or face of an aftertreatment device is the side that faces away from the incoming flow of exhaust when installed in an exhaust system. The outlet side can be referred to as the "clean" side.

FIGS. 1-6 illustrate a cleaner 20 having features that are examples of inventive aspects in accordance with the principles of the present disclosure. The cleaner 20 includes a cabinet 21 having a top side 22, a bottom side 24, a left side 26, a right side 28, a front side 30 and a back side 32. The cabinet 21 includes an upper region 34, an intermediate region 36 and a lower region 38. The front side 30 of the cabinet 21 includes a front wall 40 positioned at the upper region 34. A pressure gage 42 and a control panel 44 are mounted to the front wall 40. The front side of the cabinet 21 also includes a first door 46 for providing access to the interior of the intermediate region 36 of the cabinet 21, and a second door 48 for providing access to the interior of the lower region 38 of the cabinet 21. An electrical connection opening 45 and an air inlet opening 47 are provided at the back side 32 of the cabinet 21 (see FIGS. 2 and 5). Adjustable feet 50 are provided at the bottom side 24 of the cabinet 21 for leveling the cabinet 21. A crank handle 52 is provided at the side 28 of the cabinet 21. An air outlet 54 (see FIGS. 2 and 5) is provided at the back side 32 of the cabinet 21.

Referring to FIGS. 2-6, an air pressure tank 60 is provided at the upper region 34 of the cabinet 21, a DPF mount 62 is provided at the intermediate region 36 of the cabinet 21 and a primary filter mount 64 is located at the lower region 38 of the cabinet 21. The air pressure tank 60 and its corresponding flow control arrangement function as a pulse generator that generates pulses of air for cleaning a DPF 70 positioned at the DPF mount 62. A primary filter 72 positioned at the primary filter mount 64 functions to capture material flushed from the DPF 70. A safety filter 66 is provided for re-filtering the air that passes through the primary filter 72 before the air exits the cabinet 21 through the air outlet 54. The safety filter 66 is shown including a single, pleated panel type air filter media having a cross-dimension that generally equals a width of the cabinet 21.

In use of the system, the DPF 70 is loaded at the DPF mount 62 and the primary filter 72 is positioned at the primary filter mount 64. With the filters 70, 72 mounted within the cabinet 21, the cabinet doors 46, 48 are closed and the air pressure tank 60 is pressurized with air. When the air pressure tank 60 is filled to a predetermined air pressure, the air pressure tank 60 is opened causing a pulse of air to flush or dump downwardly from the pressure tank 60 through the DPF 70. As the pulse of air moves downwardly through the DPF 70, material (e.g., soot, ash, oil, soluble organic fraction or other material) accumulated on the DPF 70 during use is dislodged/flushed from the DPF 70 and re-captured at the primary filter 72. After passing through the primary filter 72, the air can exit the cabinet 21 through the air outlet 54 and its corresponding safety filter 66. A blower 74 is provided within the cabinet 21 for providing continuous positive pressure to the top side of the DPF 70 between air pulses. The movement of air from the blower 74 assists in causing material loosened by the air pulses to migrate downwardly to the primary filter 72. In other embodiments, a vacuum may be placed downstream of the DPF and the primary filter 72 for continuously drawing air through the DPF 70 and the primary filter 72.

It is typically preferred to mount the DPF 70 in the DPF mount 62 with the outlet side of the filter facing upwardly toward the pressure tank 60. In this configuration, the pulses of compressed air back-flush collected material from the DPF. However, in other embodiments, a filter may be cleaned by alternating between a first orientation where the outlet side faces upwardly toward the pressure tank 60 and a second orientation where the outlet side faces downwardly away from the pressure tank 60. By selectively reversing the orientation of a given filter during cleaning, material accumulated on the filter will alternately be exposed to pulses from opposite directions thereby assisting in dislodging accumulated material from the filter.

Typical DPF's are 10.5 or 11.25 inches in diameter and 14 inches in length. Another common DPF size is 12 inches in diameter and 15 inches in length. To accommodate these sizes of filter, in one non-limiting embodiment, the air pressure tank can have a volume of about 22 gallons, and the air pressure tank is pressurized to about 8-10 pounds per square inch (psi) before dumping its volume of air to generate an air pulse. In other embodiments, the air pressure tank can have a volume in the range 5-50 gallons, or a volume of at least 5 gallons. In one non-limiting embodiment, the air tank is pressurized to a pressure less than 15 pounds per square inch (psi), or in the range of 3-15 psi, or in the range of 10-15 psi. In certain embodiments, it is desirable for the air flow through the DPF during an air pulse to have an approach velocity of in the range of 20-100 feet per second, or in the range of 50-70 feet per second. Approach velocity is defined as the average speed of the air during a pulse measured at a position immediately upstream of the DPF being cleaned. Example pulse durations are in the range of 1/50 of a second to 1 second or in the range of 1/30 of a second to 0.5 second. A preferred pulse duration is about 1/20 of a second. It will be appreciated that the above numerical information is provided for illustration purposes only, and is not intended to limit the broad inventive aspects of the present disclosure.

In one embodiment, the entire pulse cleaning process can be completed in 15 minutes or less. However, certain filters may take longer than 15 minutes to clean. Therefore, the broad aspects of the invention need not be limited to a particular time frame.

It has been determined that the initial pulse is the most effective at flushing material from an aftertreatment device. Thereafter, the pulses progressively flush less and less material from the device being cleaned as the device become cleaner. In view of the particular effectiveness of the initial pulses, certain aftertreatment devices may be cleaned by using only a few pulses or even a single pulse. In practicing one method, 1-100 pulses may be used. In practicing another method, 20-70 pulses may be used. In practicing a further method, 40-60 pulses may be used. Other numbers of pulses than those specified can also be used without departing from the broad concept of the present disclosure.

At times, merely pulsing air through a given filter or other aftertreatment device may not provide adequate cleaning. For these types of circumstances, the pulse cleaning process can be used in combination with a heating process. For example, an aftertreatment device can be initially pulse cleaned as described above. If the pulse cleaning does not result in the adequate removal of material from the aftertreatment device, the aftertreatment can be heated to combust soot or other combustible materials from the filter. An example system for combusting soot or other materials from an aftertreatment device is disclosed in PCT Patent Application No. US06/01850, entitled Apparatus for Combusting Collected Diesel Exhaust Material from Aftertreatment Devices and Methods, filed on Jan. 18, 2006, which is hereby incorporated by reference in its entirety. After combusting the combustible material from the aftertreatment device, the aftertreatment device can again be pulse cleaned to flush ash or other remaining material from the device.

Figure 9:
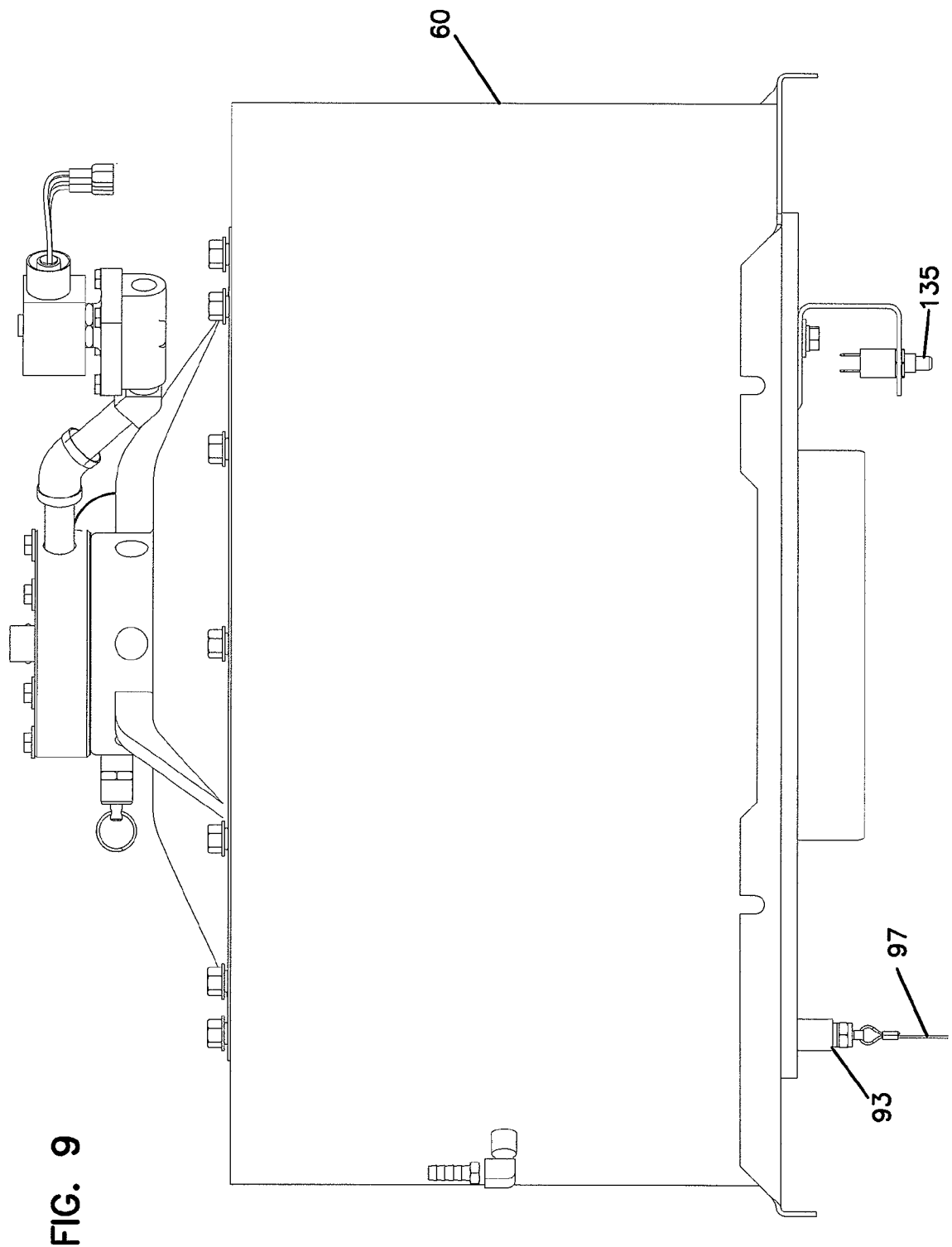
FIG. 9 is a front view of the pressure tank of FIG. 8.
Figure 10:
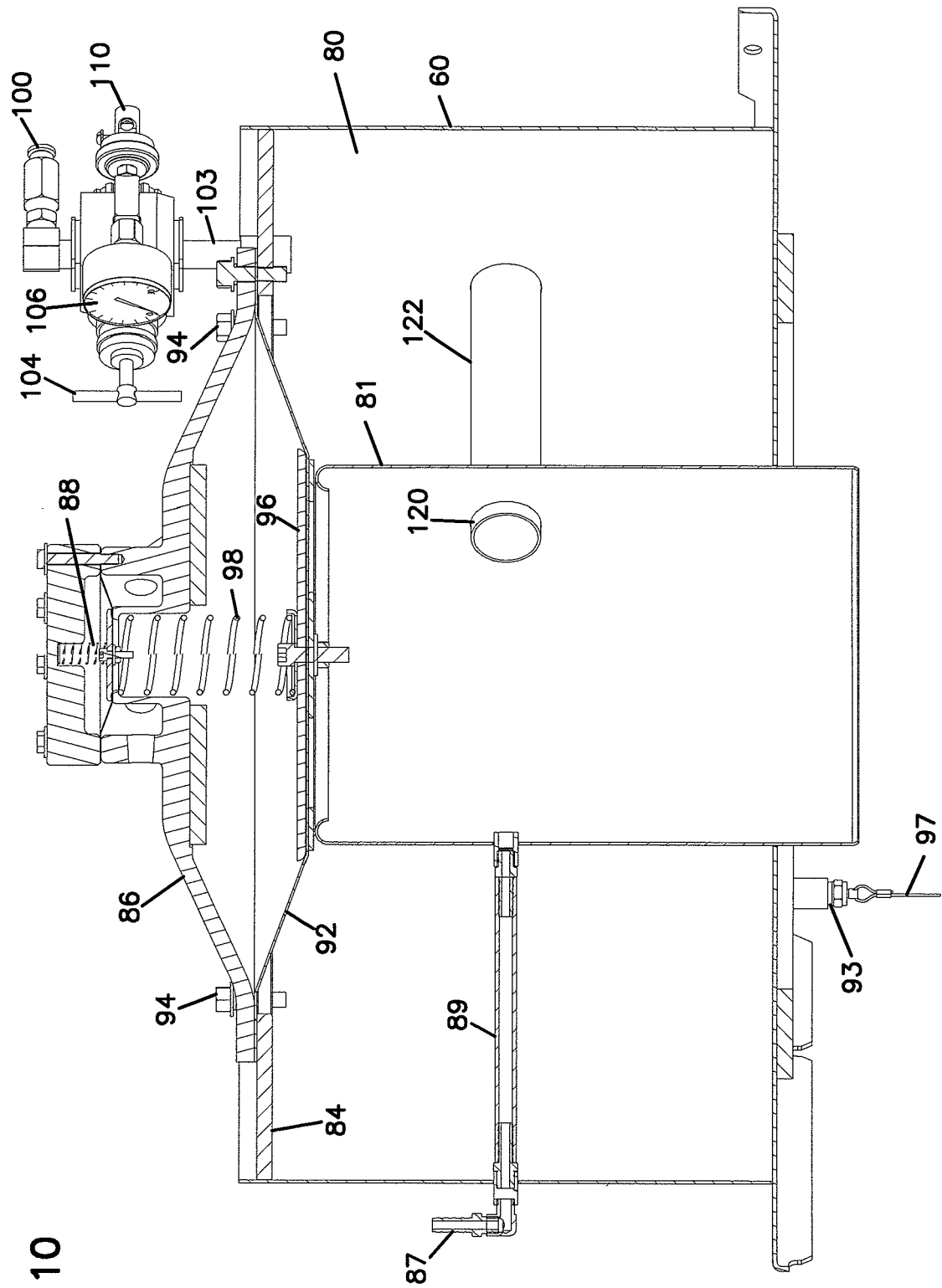
FIG. 10 is a cross-sectional view taken along section line 10-10 of FIG. 8.
Figure 11:
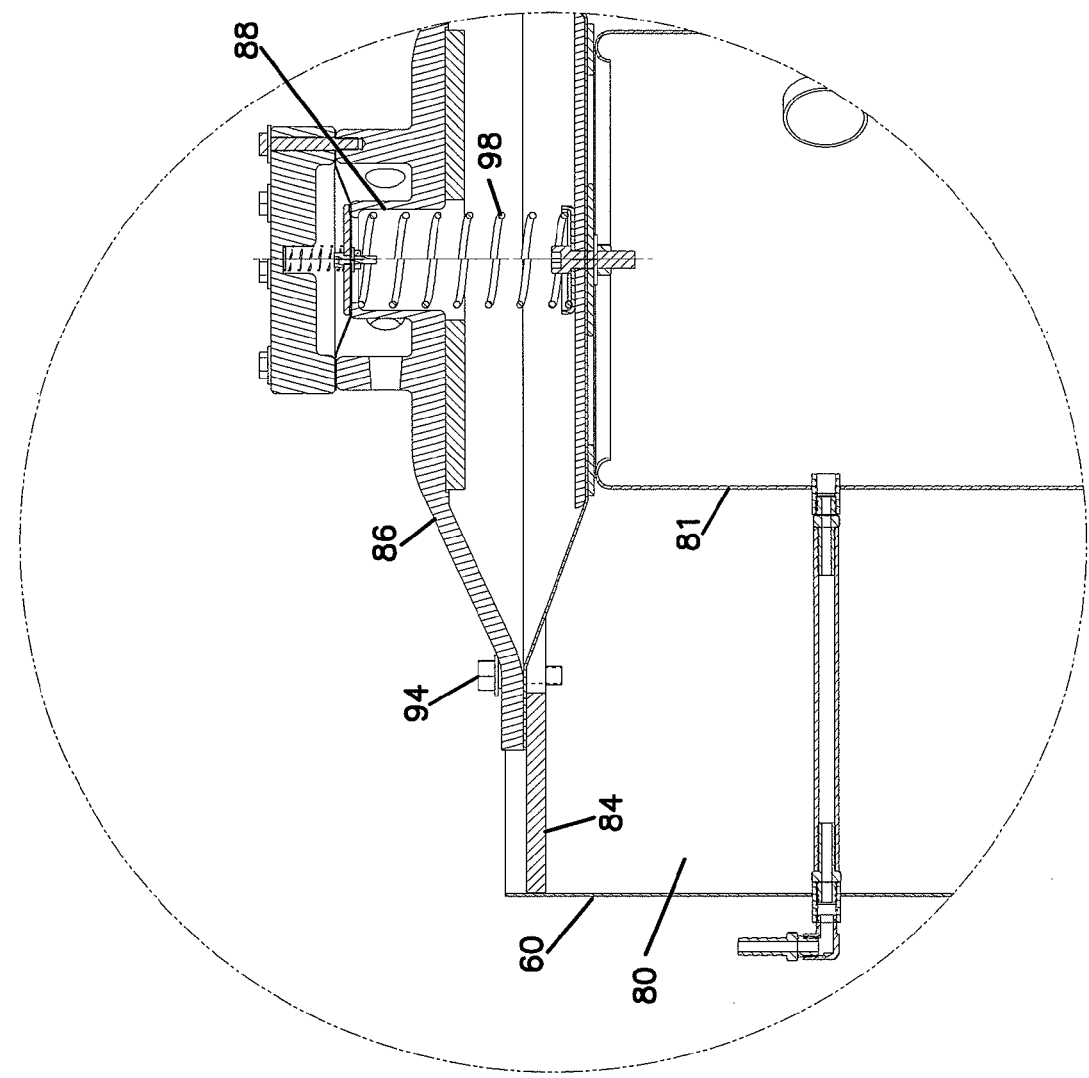
FIG. 11 is an enlarged detailed view of a portion of FIG. 10.

FIGS. 7-11 illustrate the air pressure tank 60 of the cleaner 20. As shown at FIG. 10, the pressure tank 60 defines a generally annular pressure chamber 80 that surrounds a central outlet tube 81. The top of the chamber 80 is enclosed by main wall 84 and a central cover 86 secured to the main wall 84 by fasteners 94. A diaphragm 92 is mounted beneath the cover 86. A peripheral region of the diaphragm 92 is clamped between the cover 86 and the main wall 84 to seal the outer circumference of the diaphragm 92. A reinforcing plate 96 is mounted to a central region of the diaphragm 92. As shown at FIGS. 10 and 11, the diaphragm seats on a top end of the outlet tube 81 to block fluid communication between the chamber 80 and the interior of the outlet tube 81. A spring 98 connects the reinforcing plate 96 to a solenoid valve 88 mounted to the central cover 86. When the solenoid valve 88 is actuated, the diaphragm 92 is displaced upwardly from the top end of the outlet tube 81 thereby opening fluid communication between the pressure chamber 80 and the interior of the tube 81. This allows the air within the chamber 80 to flush down the tube 81 as an air pulse.

An air input line 100 (see FIG. 2) is used to fill the chamber 80. One end of the air input line 100 is coupled to a source of compressed air. The other end of the air input line 100 is coupled to a pressure regulator 102 mounted to the main wall 84 at the top of the pressure chamber 80. The pressure regulator 102 supplies compressed air to the chamber 80 through line 103, and regulates the pressure within the chamber 80. A flow control orifice can be provided along the input line for limiting the rate at which air enters the chamber 80. A handle 104 or knob is used to set the desired pressure of the pressure regulator 102. A pressure gage 106 for measuring the pressure within the chamber 80 is coupled to the pressure regulator 102. A pressure relief valve 108 is also coupled to the regulator. In the event the pressure regulator fails, the pressure relief valve 108 prevents excessive pressure from accumulating within the chamber 80. A pressure switch 110 (see FIG. 6) is further coupled to the pressure regulator 102. When the pressure chamber is pressurized to a predetermined air pressure, the pressure switch 100 closes. Upon closure of the switch 100, the solenoid valve 88 is actuated causing the diaphragm 92 to open fluid communication between the chamber 80 and the interior of the outlet tube 81.

As indicated above, the diaphragm 92 functions to open and close fluid communication between the chamber 80 and the interior of the outlet tube 81. When the chamber 80 is being pressurized, the diaphragm 92 seats on an upper end 100 of the outlet tube 81 to close fluid communication between the chamber 80 and the interior of the tube 81. The solenoid 88 and the spring 98 hold the diaphragm against the upper end 100 of the tube 81. During pressurization of the chamber 80, bleed holes in the diaphragm 92 allow air from the main chamber to bleed into the region between the cover 86 and the diaphragm 92. This provides a pressure balance that prevents pressure within the main chamber from prematurely lifting the diaphragm from the top end of the outlet tube as the chamber 80 is pressurized. The chamber 80 is placed in fluid communication with the interior of the outlet tune 81 by actuating the solenoid valve 88. When the solenoid valve 88 is actuated, the spring pressure holding the diaphragm 92 against the tube 81 is released causing the diaphragm 92 to lift upwardly to open fluid communication between the pressure chamber 80 and the interior of the tube 81. In an example embodiment, the diaphragm 92 can have an outer diameter in the range of 5-10 inches, or in the range of 6-9 inches, or about 7-8 inches.

In certain embodiments, the tank 60 can be equipped with a tank drain 93 (see FIG. 3) for allowing any moisture condensate that may collect in the chamber 80 to be blown from the chamber 80. The tank drain 93 is defined through a bottom wall of the tank 60. A plug is spring biased to a closed position to normally close the drain 93. The drain 93 is opened pulling downwardly on cord 97 attached to the plug.

Referring to FIG. 10, the outlet tube 81 defines a hole 120 for connecting the blower 74 to the interior of the outlet tube 81. A pipe 122 (shown at FIG. 10) extends from the hole 120 to the exterior of the chamber 80. A hose 124 connects the blower 74 to the pipe 122. A one-way check valve 126 (see FIG. 7) prevents air from traveling through the hose 124 in a direction toward the blower 74. This prevents the backward flow of air through the hose when air is pulsed from the pressure chamber 80 through the outlet tube 81. An air filter is used to filter the intake air drawn in by the blower 74.

Figure 2:
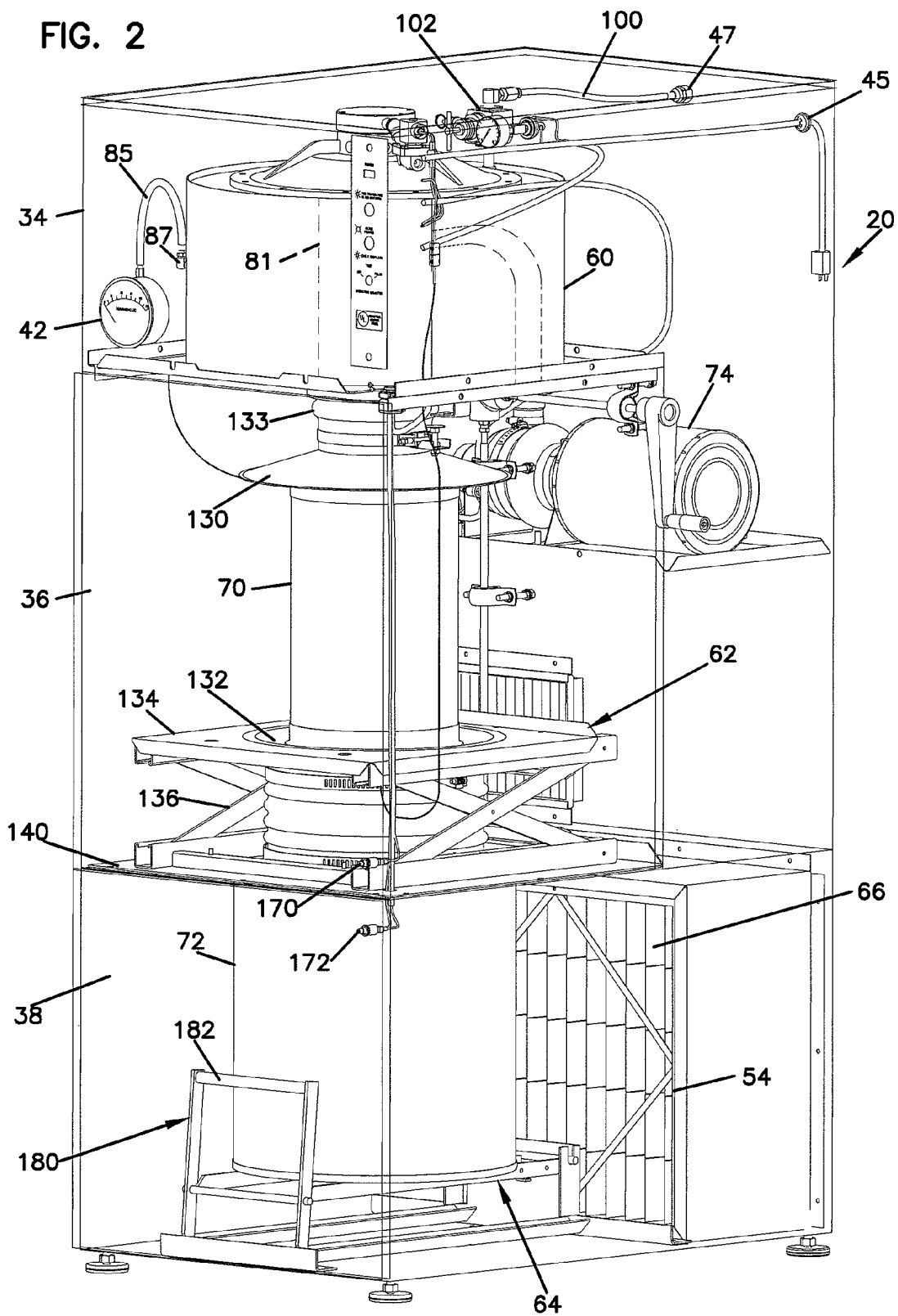
FIG. 2 is a perspective view of the cleaner of FIG. 1 with the walls of the cabinet removed to show the interior components.
Figure 3:
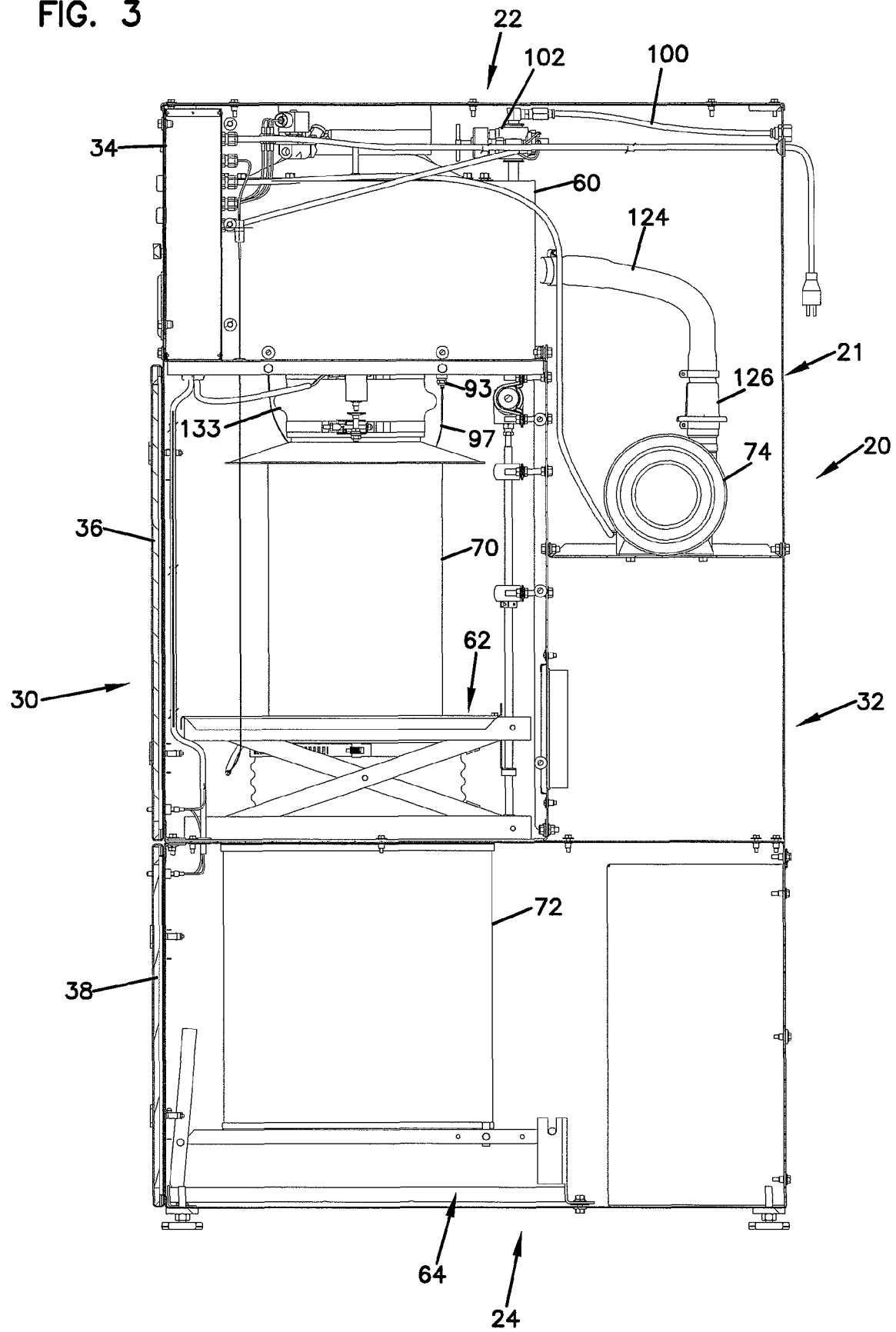
FIG. 3 is a side view of the cleaner of FIG. 1 with the side wall removed to show the interior component.
Figure 4:
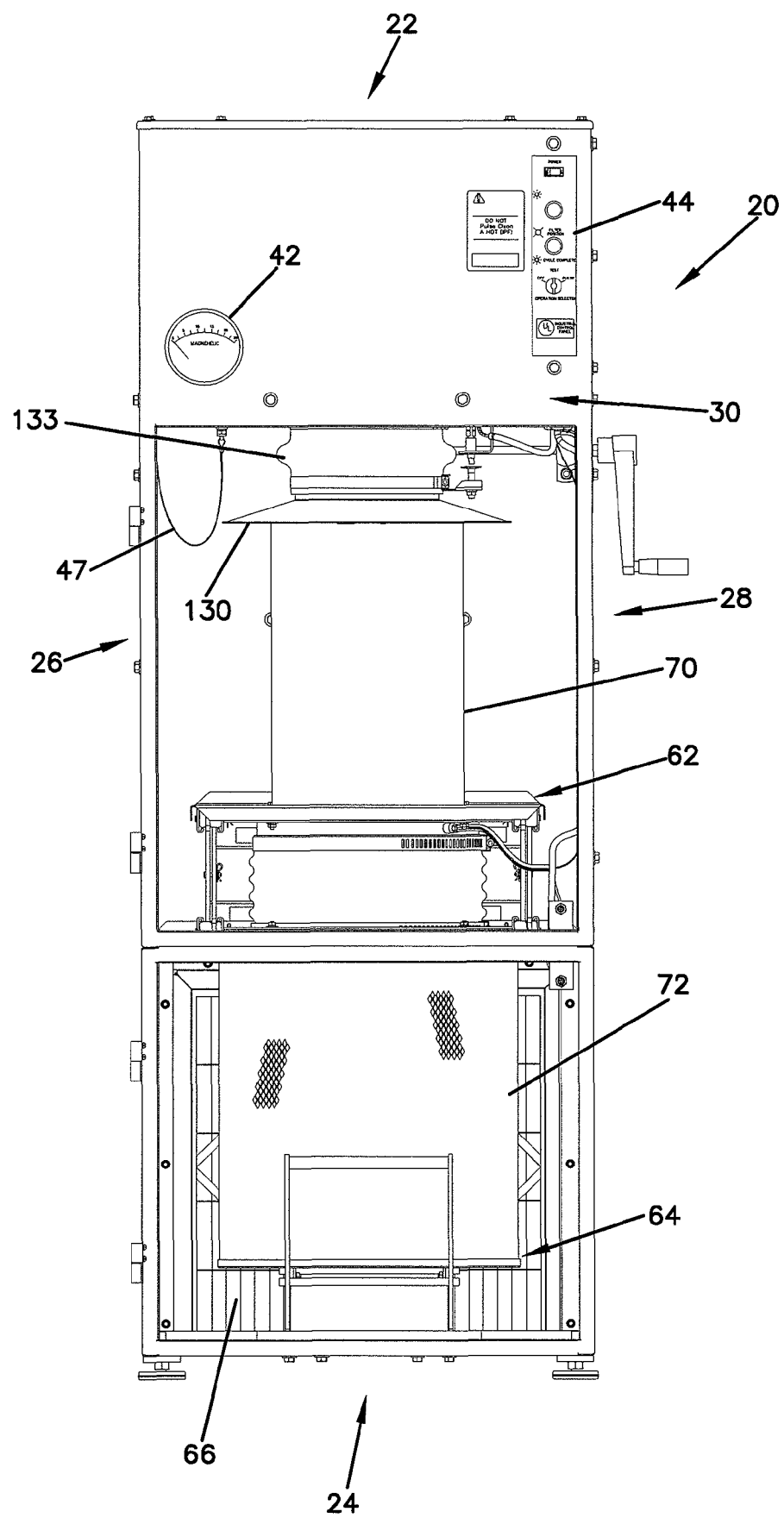
FIG. 4 is a front view of the cleaner of FIG. 1 with the two front doors removed.
Figure 5:
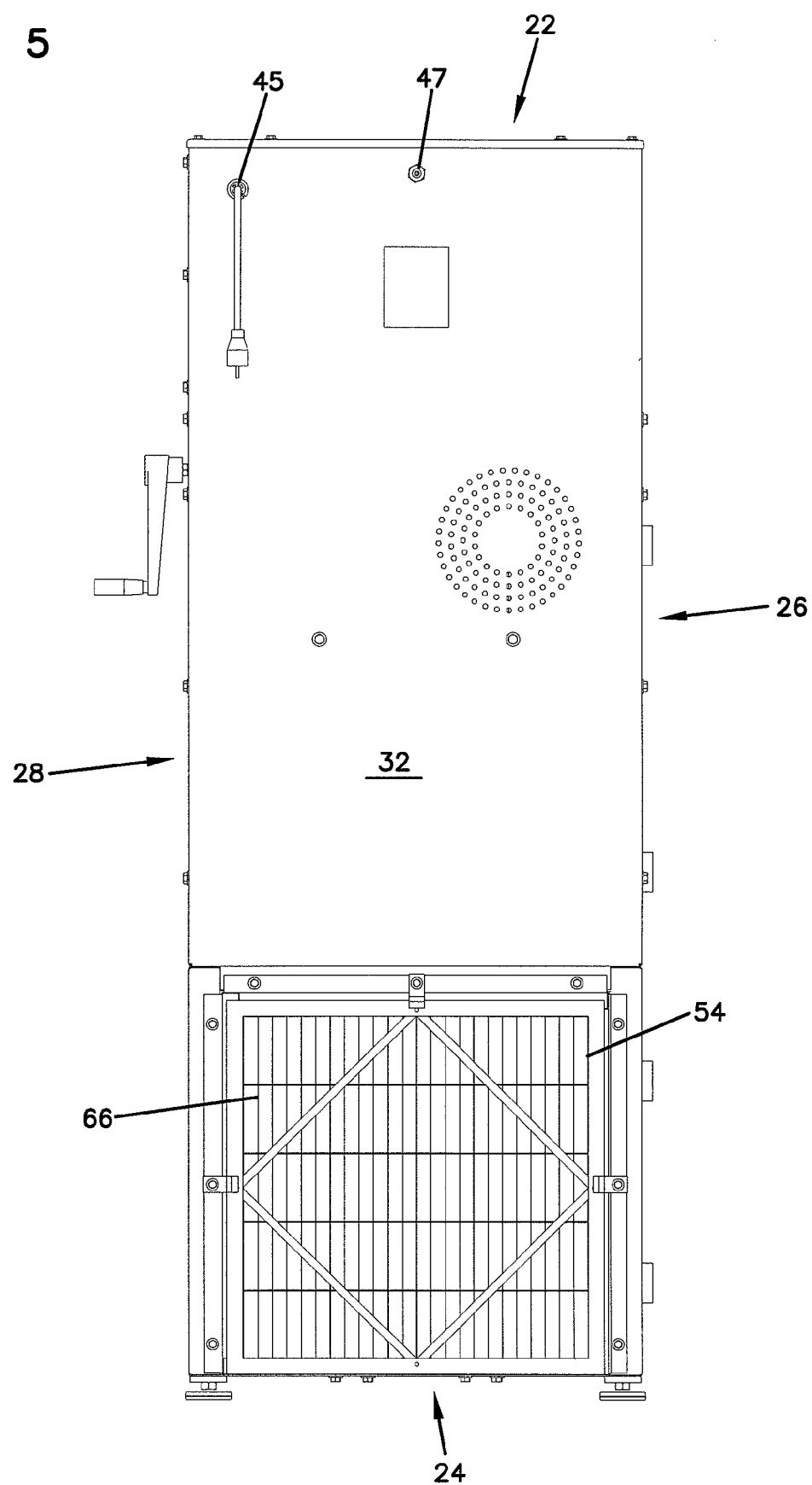
FIG. 5 is a rear view of the cleaner of FIG. 1.
Figure 6:
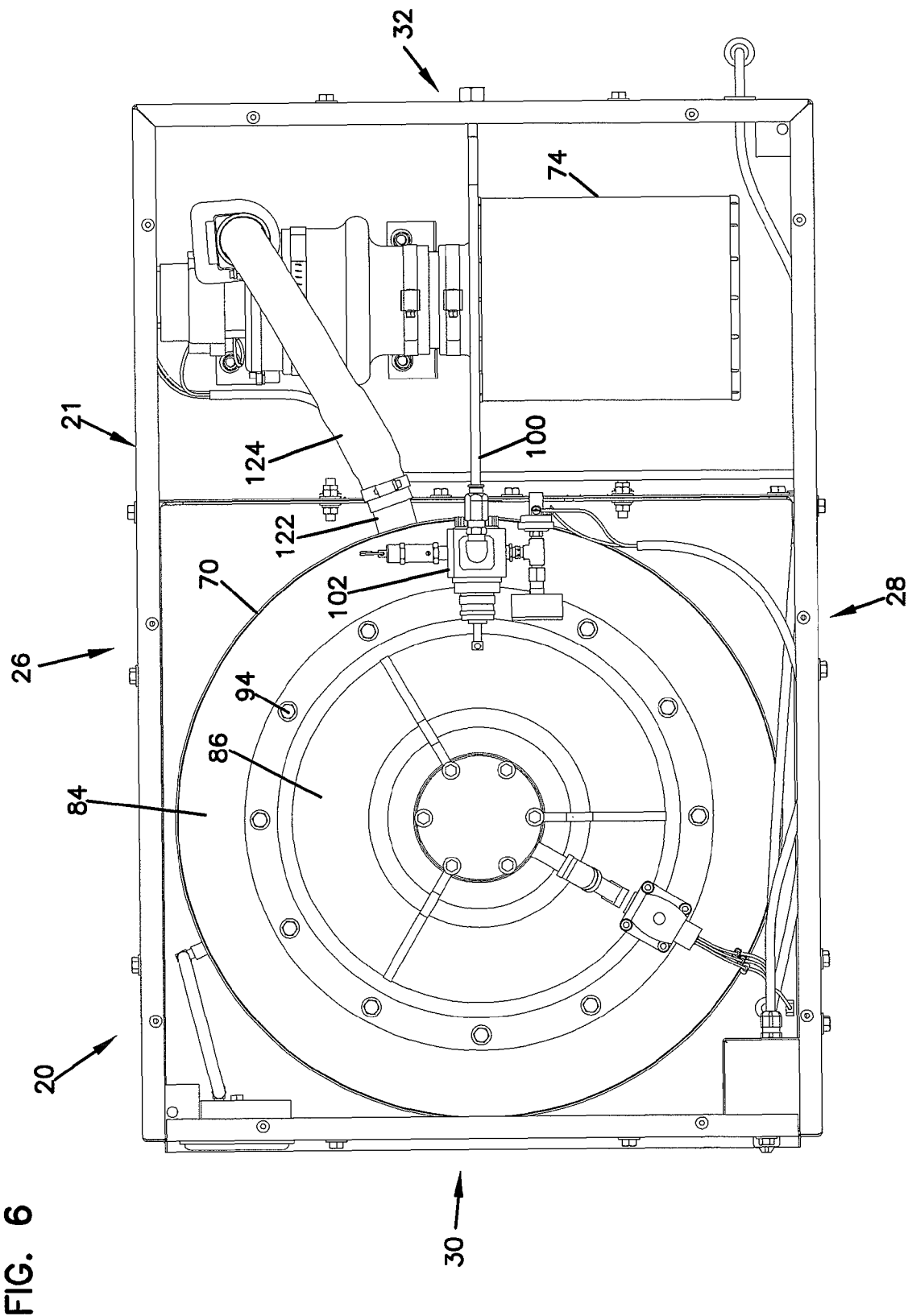
FIG. 6 is a top view of the cleaner of FIG. 1 with the top wall removed.
Figure 7:
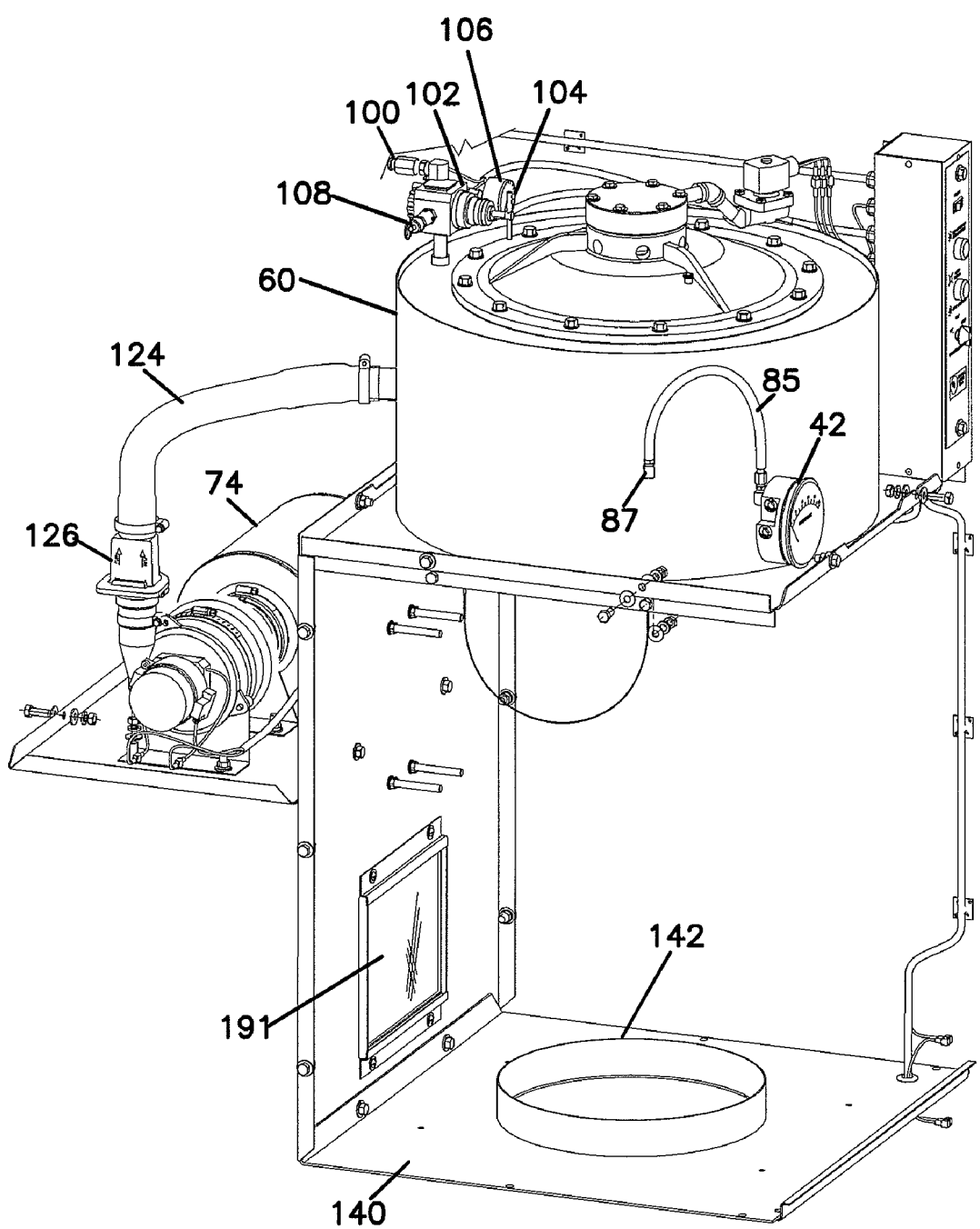
FIG. 7 is a perspective view of a pressure tank and blower assembly of the cleaner of FIG. 1.
Figure 8:
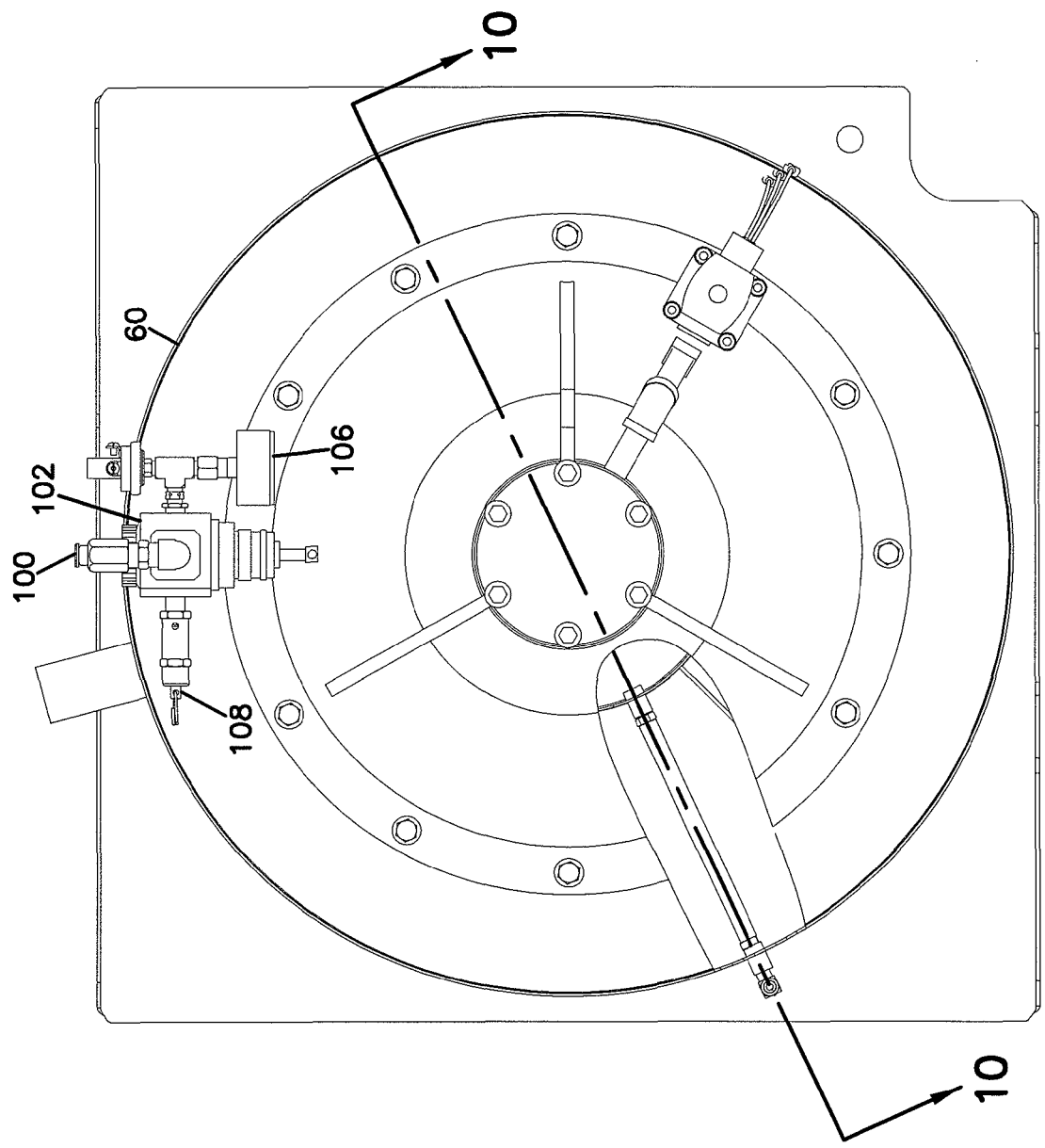
FIG. 8 is a top view of the pressure tank of FIG. 7.
Figure 12:
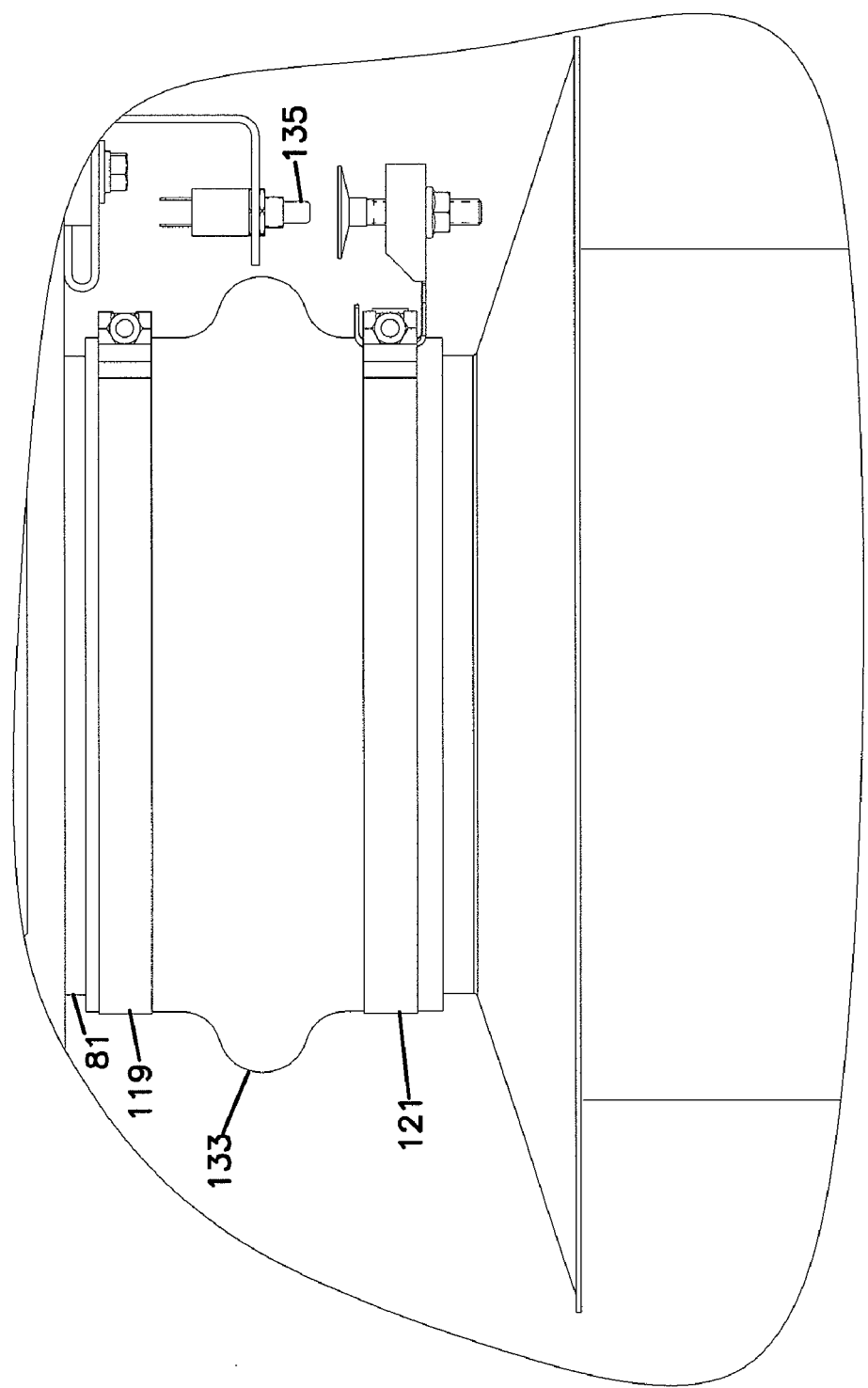
FIG. 12 is a front view of an upper DPF mounting cone of the cleaner of FIG. 1.

Referring to FIG. 2, the DPF mount 62 of the cleaner 20 includes an upper sealing cone 130 and a lower sealing cone 132. As shown at FIG. 9, the upper sealing cone 130 is connected to the lower end of the pressure chamber outlet pipe 81 by a flexible hose 133. The ends of the hose 133 are held in place with hose clamps 119, 121 (see FIG. 12). A proximity switch 135 is positioned adjacent the upper sealing cone 130.

Figure 13:
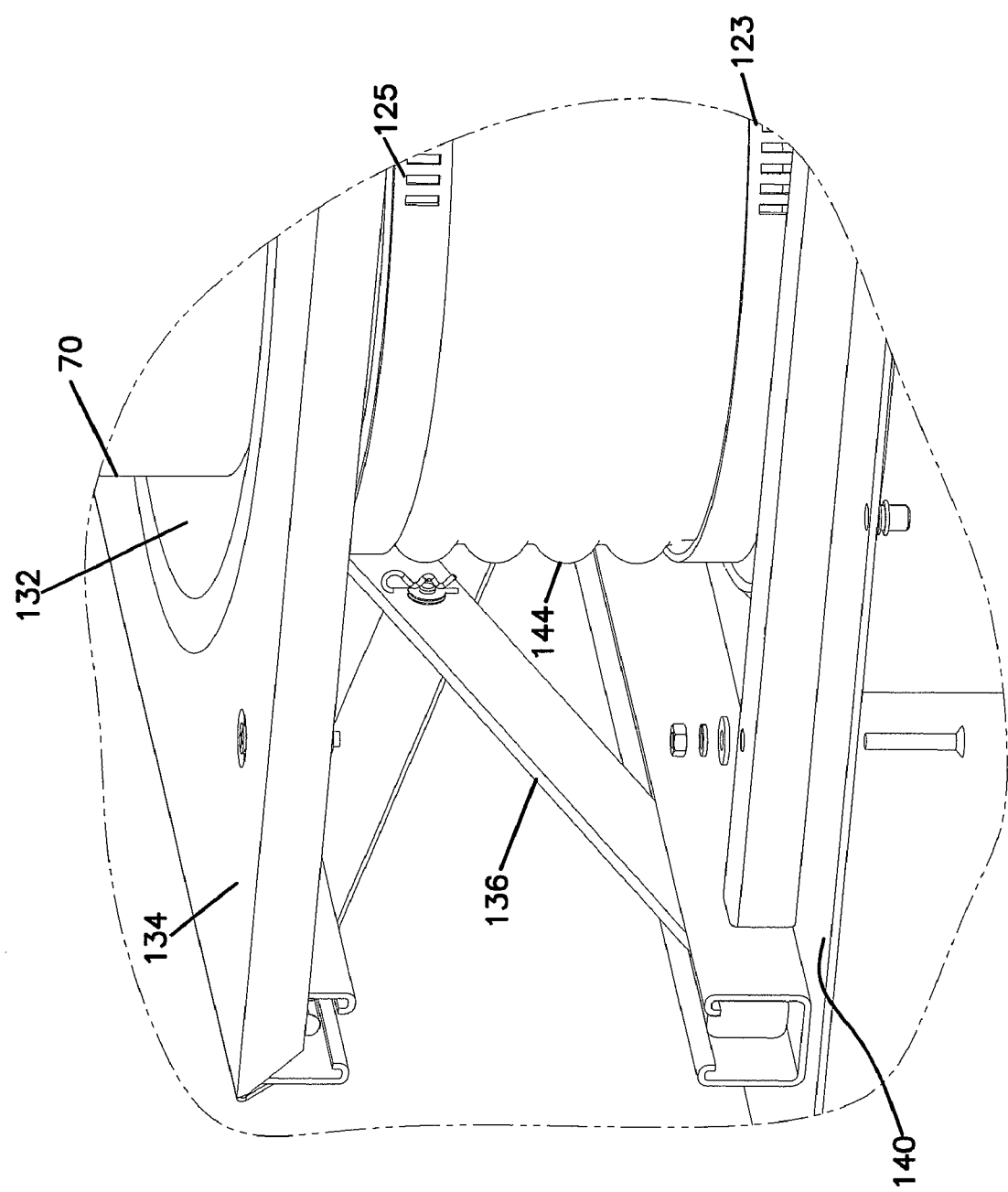
FIG. 13 illustrates a portion of a scissor lift of the cleaner of FIG. 1.
Figure 14:
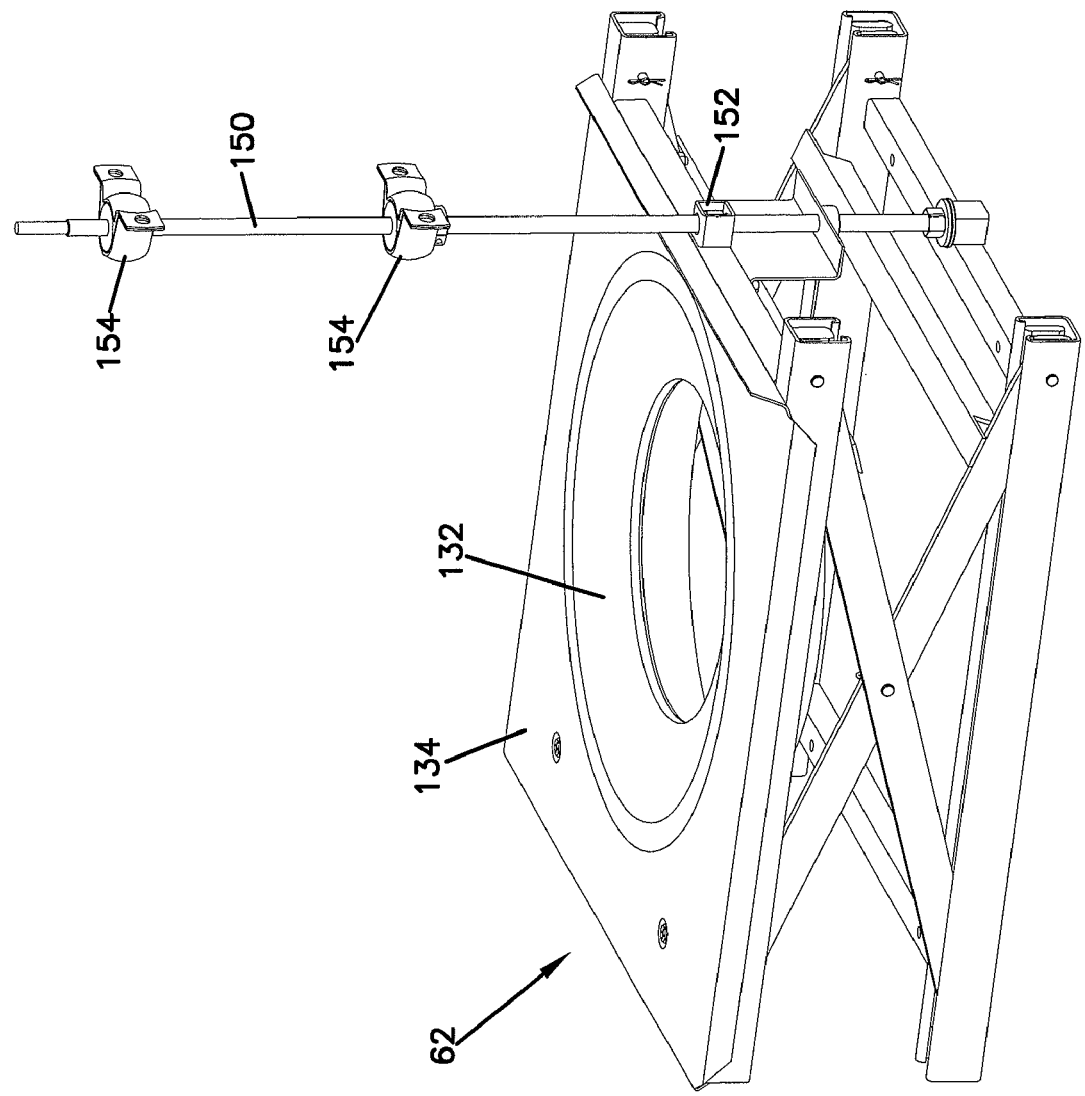
FIG. 14 is a perspective view of a scissor lift of FIG. 1.

Referring to FIGS. 2, 13 and 14, the lower sealing cone 132 is supported on a platform 134. The platform 134 can be raised and lowered by a scissors lift 136. The scissors lift 136 is supported on a plate 140 positioned directly above the primary filter 72. The plate 140 includes a circular rim 142 (see FIG. 7). As shown at FIG. 13, the lower sealing cone 132 is connected to the rim 142 by a flexible hose 144. The ends of the hose 144 are held in place with hose clamps 123, 125. Each of the cones 130, 132 preferably includes a resilient inner liner covering the conical interior surfaces of the cones 130, 132. The liners are adapted to provide circumferential seals with the ends of a DPF mounted between the cones 130, 132.

Figure 15:
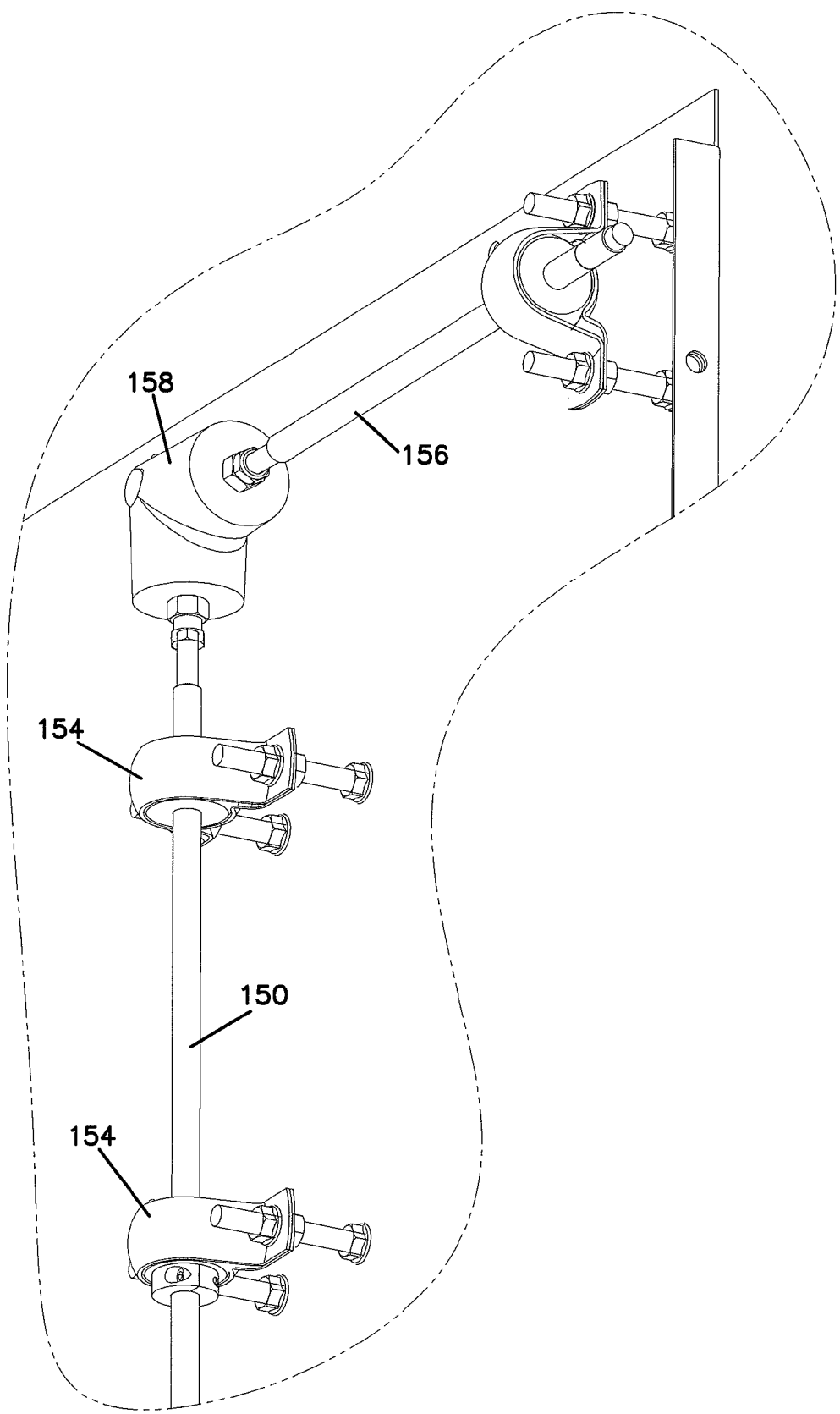
FIG. 15 is a perspective view of a drive linkage for driving the scissor lift of FIG. 14.

The scissors lift 136 includes two pairs of scissors that guide vertical movement of the platform 134. The scissors lift 136 is driven by the manual crank handle 52 provided at the right side of the cabinet 21. A linkage connects the crank handle to the platform 134. The linkage includes a vertical shaft 150 (see FIGS. 14 and 15) that having a threaded portion that threadingly engages a drive nut 152 secured to the platform 134. Bearings 154 secured to the right wall of the cabinet 21 support the vertical shaft 150. As shown at FIG. 15, the linkage also includes a horizontal shaft 156 coupled to the handle 52, and a right angle drive 158 for transferring torque from the horizontal shaft 156 to the vertical shaft 150. When the vertical shaft 150 is rotated about its axis in a first direction, the nut 152 rides upwardly on the threads to raise the platform 134. When the vertical shaft is rotated in the opposite direction about its axis, the nut rides downwardly on the threads to lower the platform 134. In alternative embodiments, an automated drive system including a motor such as an electric motor can be used to raise and lower the platform 134. For such an embodiment, the electric motor can be controlled by the system controller so that the platform 134 is automatically raised when the cabinet is closed and automatically lowered when the cabinet is opened. In still other embodiments, a mechanical vibrator can be included in the cabinet for shaking the DPF during the cleaning process. Further views of the scissors lift 136 can be found at U.S. application Ser. No. 11/335,163, entitled "Apparatus for Cleaning Exhaust Aftertreatment Devices and Methods", filed on Jan. 18, 2006, that is hereby incorporated by reference in its entirety.

In use, the cabinet door 46 is opened and the handle 52 is cranked to move the cones 130, 132 apart a sufficient distance to remove a previously cleaned DPF from between the cones. After the previously cleaned DPF has been removed, a DPF in need of service is inserted between the cones 130, 132. The DPF is preferably mounted with the inlet side facing the lower cone 132 and the outlet side facing the upper cone 130. The handle 52 is then cranked to move the lower cone 132 upwardly toward the upper cone 130 until the proximity switch 135 is closed. In this position, the DPF is compressed axially between the two cones 130, 132 such that the cones provide circumferential seals around the inlet and outlet ends of the DPF. The pulse system can then be operated such that pulses of air generated at the pressure chamber 80 are each directed at substantially the entire outlet face of the DPF held between the cones 130, 132. The pulses continue for a timed cleaning duration. Alternatively, the pulses can continue until the backpressure gage 42 provides an indication that DPF has been adequately cleaned. After the pulse cleaning has been terminated, the cleaned DPF can be removed from the cabinet. Thereafter, the steps can be repeated to clean subsequent DPF's.

The proximity switch 135 interfaces with a controller that prevents the cleaner 20 from being operated unless the switch 135 has been closed. Proximity switches 170, 172 (see FIG. 2) are also provided at the doors 46, 48. The switches 170, 172 also interface with a controller that prevents the cleaner 20 from being operated unless the switches 170, 172 have been closed. A further safety feature of the system is a pressure relief panel 191 (see FIG. 7) provided at the wall of the cabinet adjacent the intermediate region. In the event excessive pressure accumulates in the cabinet 21, the panel 191 will open to relieve the pressure. In one embodiment, the panel 191 can be a break away panel such as a frangible panel. Alternatively, the panel 191 can be a swing door that swings open if the pressure within the cabinet exceeds a predetermined amount. A mechanical spring latch or other means (e.g., a magnet) can be used to hold the door closed. A panel filter can also be provided in front of the panel 191 to filter air that leaves the cabinet when the panel 191 opens.

Figure 16:
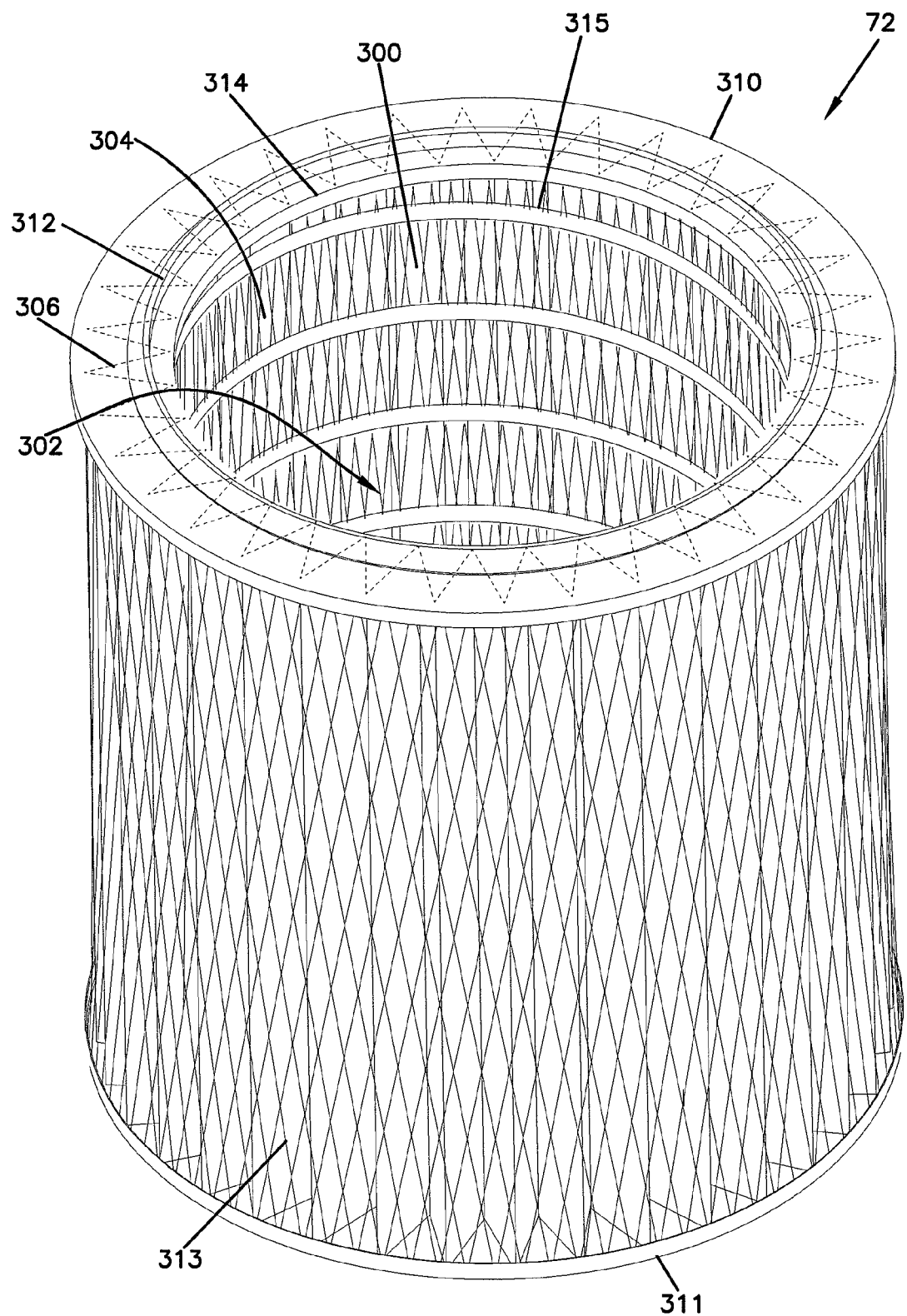
FIG. 16 is a perspective view of an example primary filter for use with the cleaner of FIG. 1.

The primary filter 72 of the cleaner 20 can have any number of different configurations. In one embodiment (see FIG. 16), the filter 72 is cylindrical and includes a central cylindrical liner or core 300 (e.g., a metal or plastic core) defining a central longitudinal opening 302. The core 300 defines a plurality of through-holes 304 and is surrounded by an annular pleated filter media 306. End caps 310, 311 can be provided at the top and bottom ends of the filter 72. The top end cap 310 defines a central opening 314 in fluid communication with the central longitudinal opening 302 of the core 300. A face seal 312 can be provided at the top of the filter surrounding the central opening 314. The filter media 306 is preferably secured to the core 300 to prevent the media from billowing outwardly during a pulse of air. For example the inner pleat tips of the media 306 can be bonded to the core 300. In one embodiment, the inner pleat tips are bonded to the core 303 with an adhesive material such as a hot meld adhesive. For example, a bead 315 of hot melt adhesive can be applied in a helical pattern to the interior of the core. As the hot melt adhesive is applied to the interior of the core 300, the adhesive flows through the through-holes 304 and contacts the inner pleat tips to bond the inner pleat tips to the outside of the core 300. An outer liner 313 can also be provided around the filter media 316.

In use, air that has passed through the DPF enters the primary filter 72 through the central openings 314, 302, and then flows radially outwardly through the pleated filter media 306. As the air flows through the media, soot, ash, oil or other materials in the air are captured on the filter media 306. After passing through the pleated filter media, the air can exit the cabinet 21 through the safety filter 66 at the outlet 54. The primary filter preferably has the capacity to accumulate material from a relatively large number of DPF's before needing replacement.

The primary filter mount 64 of the cleaner 20 is accessed by opening the front door 48. As shown at FIG. 2, the primary filter mount 64 includes a cam lift 180 for lifting the primary filter 72 to compress the face seal of the filter against the underside of the plate 140 to form a seal between the top of the filter 72 and the underside of the plate. When the filter is seated at the mount 64, the central opening of the filter 72 preferably aligns with the hole defined by the rim 142 of the plate 140. To lift the filter 72 into the sealed position, a handle 182 of the cam lift is pivoted upwardly from a lowered position to a raised position.

Figure 17:
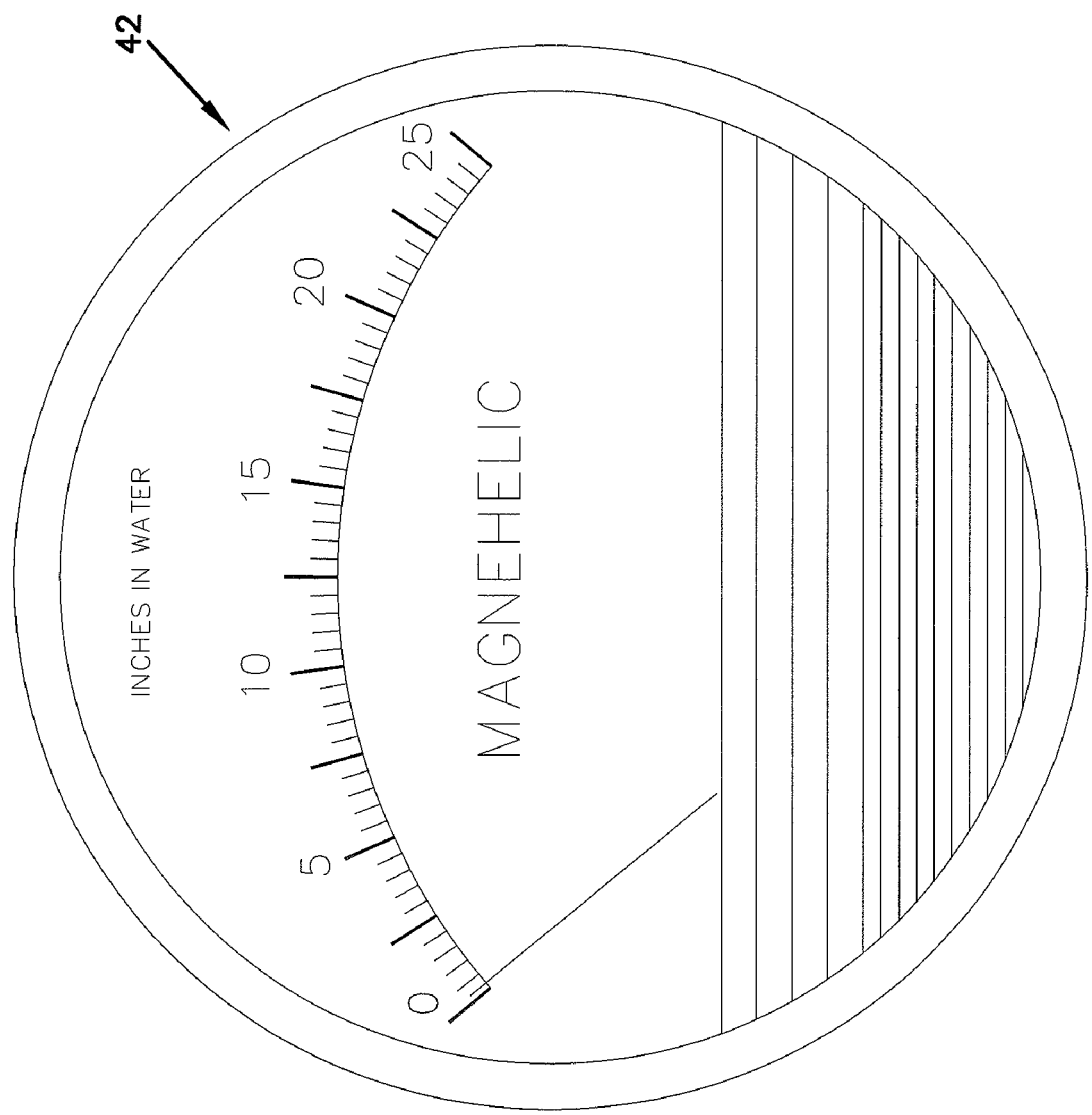
FIG. 17 is a front view of a front pressure gage of the cleaner of FIG. 1.

FIG. 17 is an enlarged view of the pressure gage 42 provided at the front of the cabinet 21. The pressure gage measures the air pressure within the outlet tube 81. In one embodiment, a hose 85 (see FIGS. 2 and 7) connects the gage 42 to a fitting 87 of a pipe 89 (see FIG. 10) that extends through the pressure chamber 80 to the interior of the outlet pipe 81. The pressure gage 42 provides a reading up to 25 inches of water.

The pressure gage 42 works in combination with the blower 74 to provide an indication as to the cleanliness of the DPF. For example, between pulses, the blower 74 provides a steady flow of air to the upper side of the DPF. The resistance to this air flow by the DPF causes backpressure at the upper side of the DPF. The pressure gage 42 measures this backpressure. The backpressure will drop as the DPF becomes less plugged. Therefore, by monitoring the level of backpressure between pulses, it is possible to assess the cleanliness of the DPF. For example, when the backpressure falls below a predetermined value, or drops a predetermined amount relative to a starting backpressure, the cleaning process can be terminated. The air pressure provided by the blower 74 also assists in causing material dislodged from the DPF during a pulse to migrate toward and be captured on the primary filter 72. In one embodiment, the blower 74 is configured to provide in excess of 100 inches of water of pressure over a plugged DPF between pulses.

Figure 18:
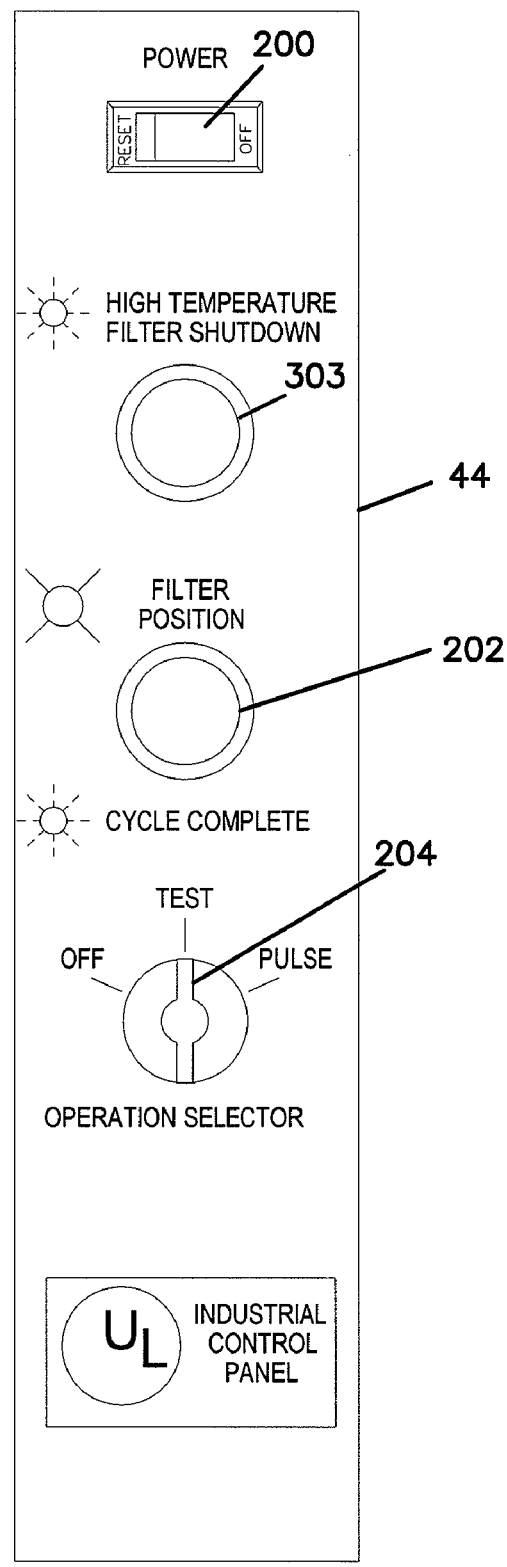
FIG. 18 is a front view of a front control panel of the cleaner of FIG. 1.

FIG. 18 is an enlarged view of the control panel 44 provided at the front of the cabinet 21. The panel 44 interfaces with a controller that coordinates operation of the various electronic components of the system (e.g., the pressure switch 110, the solenoid 88, the blower, the sensors 135, 170, 172, etc.). The panel 44 includes a power switch 200 for turning the cleaner 20 on and off. The panel 44 also includes an LED 202 that illuminates when a DPF has been properly mounted at the DPF mount 62. The panel 44 further includes a switch 204 for activating only the blower ("test") and for activating the blower and the pulse generator together ("pulse"). When the switch is set to "test", only the blower 74 is activated giving the operator the opportunity to evaluate the cleanliness of the DPF by evaluating the backpressure reading of the pressure gage 42. When the switch is set to "pulse", the blower is operated and concurrently the pulse generator is activated to clean a DPF within the cabinet 21. The panel further includes a high temperature shutdown light 303.

The system can also be equipped with a pulse counter for counting the number of pulses generated by the pulse generator. The pulse counter can be used to determine the number of pulses used to clean a given DPF or to determine the appropriate time to replace the primary filter. The counter can also be used for warranty purposes. In one embodiment, a predetermined pulse sequence can be preprogrammed into the system controller for controlling the timing, pulse frequency and overall operation of the pulse sequence. In one example embodiment, the sequence is programmed to provide a 15 minute cleaning period with 20 pulses. In other embodiments, a timer can be used.

Figure 19:
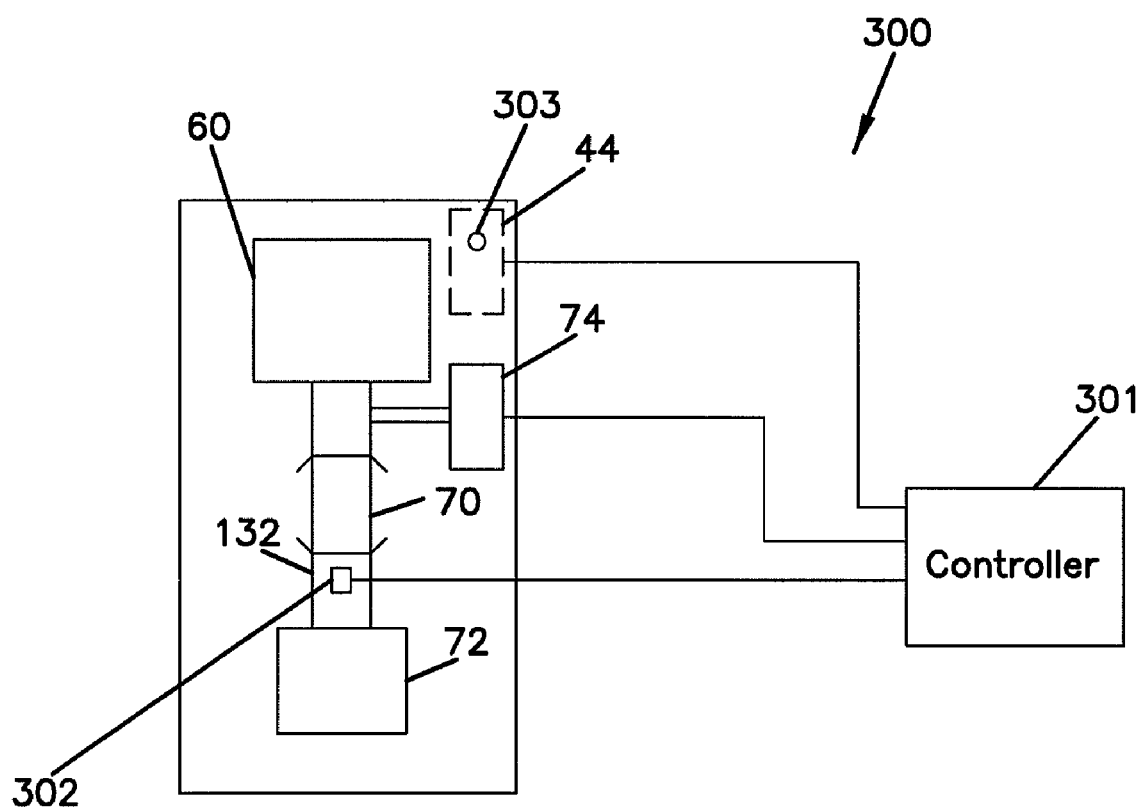
FIG. 19 is a schematic view of a temperature sensing system used in the cleaner of FIG. 1.

To reduce the risk of fire within the cabinet, only adequately cooled DPF cores should be cleaned within the cabinet. In this regard, the pulse cleaner 20 can be equipped with a temperature sensing system 300 (see schematic depiction at FIG. 19) that prevents hot DPF cores from being cleaned within the cabinet. When a DPF is loaded into the cabinet, the temperature sensing system prevents a pulse cleaning sequence from being initiated until after the system determines that the DPF is sufficiently cool. When the DPF is loaded into the cabinet, a system controller 301 of the pulse cleaner 20 initially activates the blower 74 for a predetermined time period (e.g., 90 seconds) causing air to blow downwardly through the DPF. The temperature sensing system includes a temperature sensor 302 for measuring the temperature of the air exiting the DPF. In one example embodiment, the temperature sensor 302 (e.g., a thermocouple, bi-metallic switch or other structure) is positioned inside the lower cone 132. The temperature sensor 302 provides temperature data/readings to the system controller 301. If the temperature of the air exiting the DPF exceeds a predetermined temperature level (e.g., 200° F.) at any time during a test sequence or a pulsing sequence, the system controller 301 turns off the blower 74 and aborts the cleaning session. Simultaneously, the system controller 301 illuminates the high temperature shutdown light 303 on the control panel 44.

The light 303 notifies the user that the core temperature of the DPF is too high to safely proceed with the cleaning session. If the temperature of the air exiting the DPF does not exceed the predetermined temperature for the predetermined initial time period, the system controller 301 allows/causes the cleaner to proceed with a pulse cleaning sequence.

Figure 20:
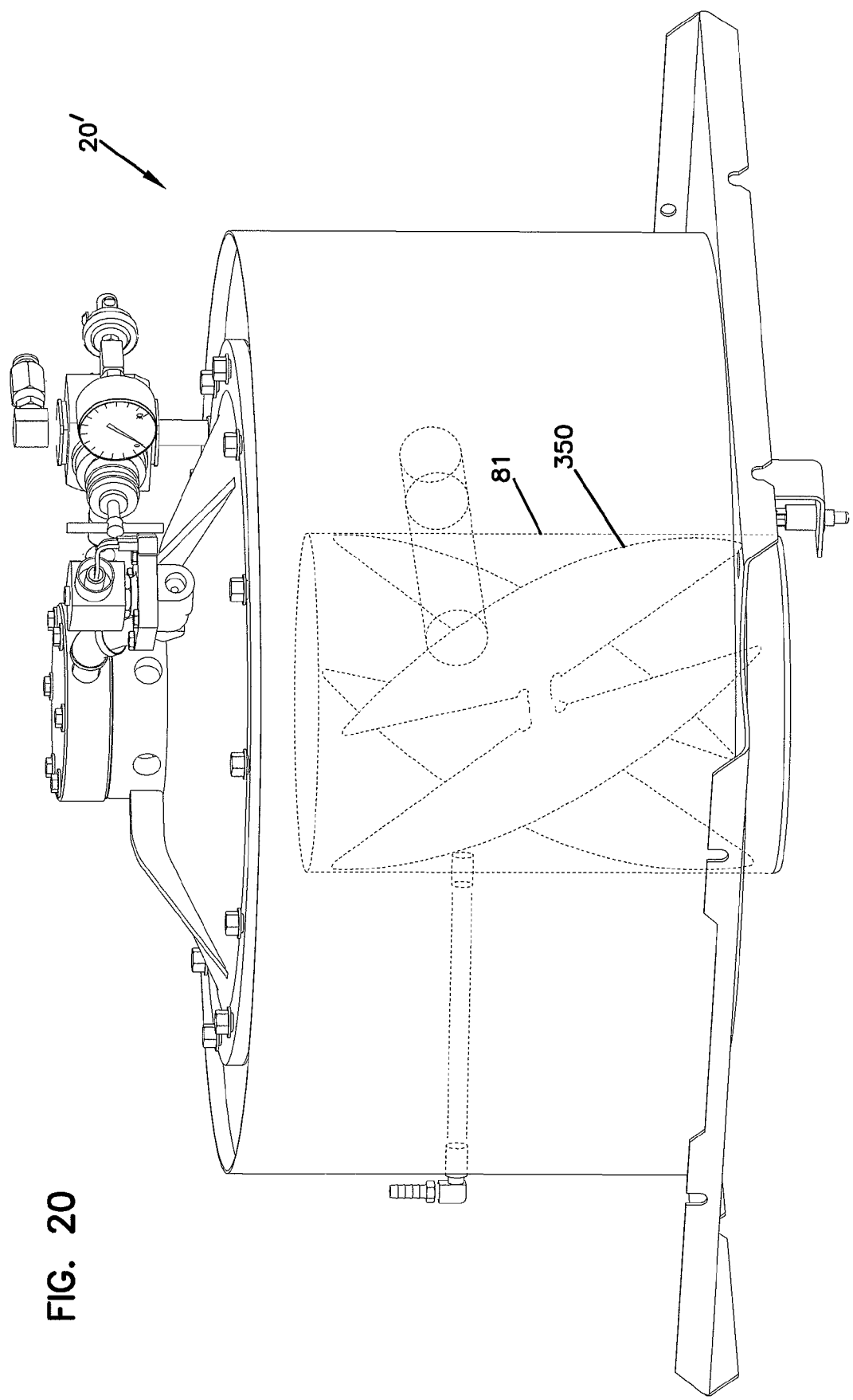
FIG. 20 is a perspective view of a modified pulse cleaner having features in accordance with the principles of the present disclosure.

FIG. 20 shows a further pulse cleaner 20' having features in accordance with the principles of the present disclosure. The pulse cleaner 20' has the same general components and functions in the same general manner as the previously described pulse cleaner 20. However, the pulse cleaner 20' has been modified to include a structure for causing the pulses of air that impinge upon the DPF to have a directional component that is not perpendicular to the face of the DPF. For example, as shown at FIG. 20, a plurality of vanes 350 is provided within the conduit 81 at a location immediately upstream of the DPF. The vanes 350 are configured to impart some rotation or a swirling action (e.g., spiral) to each pulse of air that passes through the conduit 81. The swirling action causes the pulses of air to have a lateral component (i.e., a directional vector component that is parallel to the face of the DPF). By impinging upon the face of the DPF at a non-perpendicular angle, the air pulse can effectively clean cores have face plugging. Additionally, the lateral component reduces the likelihood for the pulse of air to be directed primarily through a path of least resistance that does not include all of the longitudinal channels of the DPF.

Figure 21:
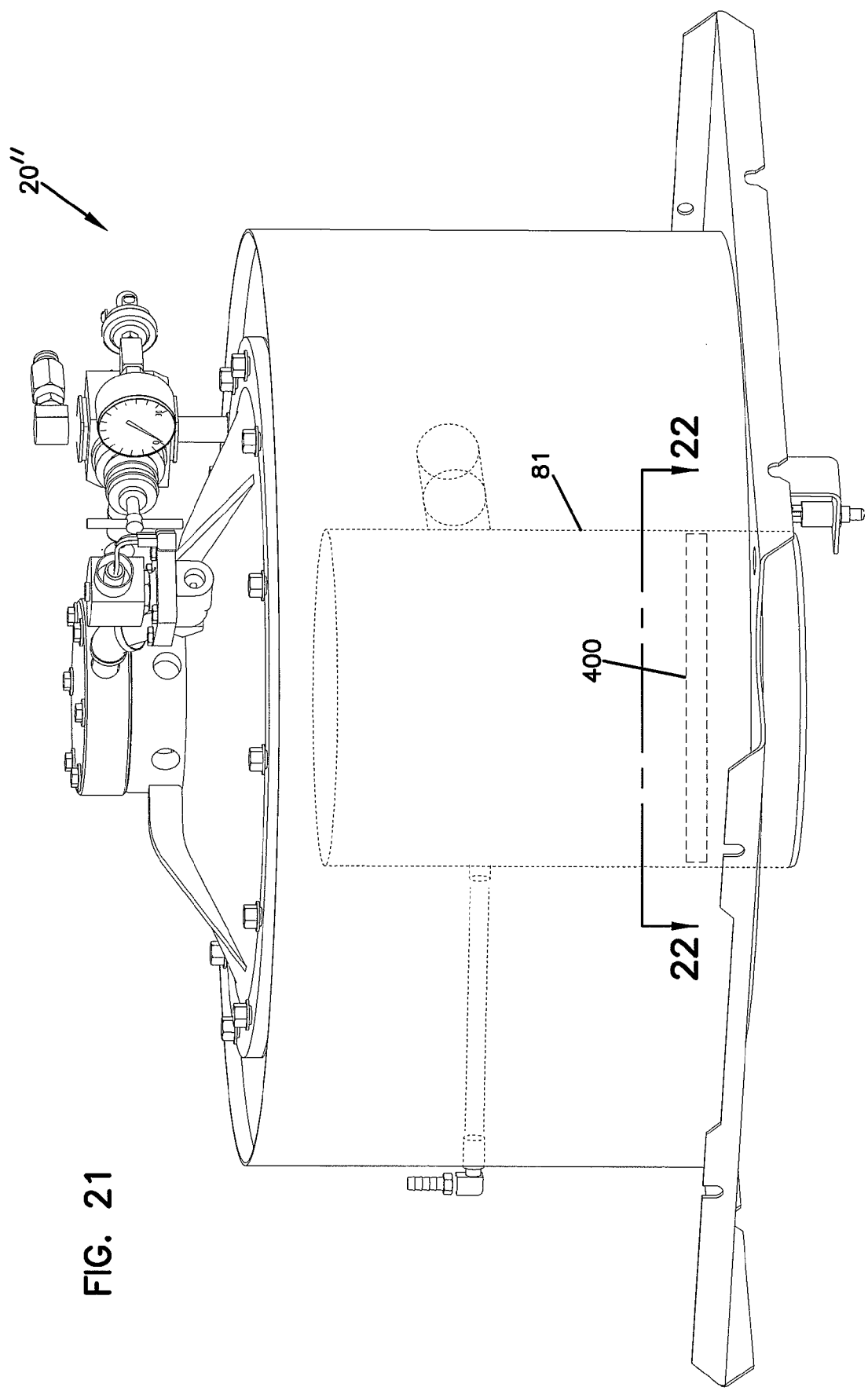
FIG. 21 is a perspective view of another modified pulse cleaner having features in accordance with the principles of the present disclosure.
Figure 22:
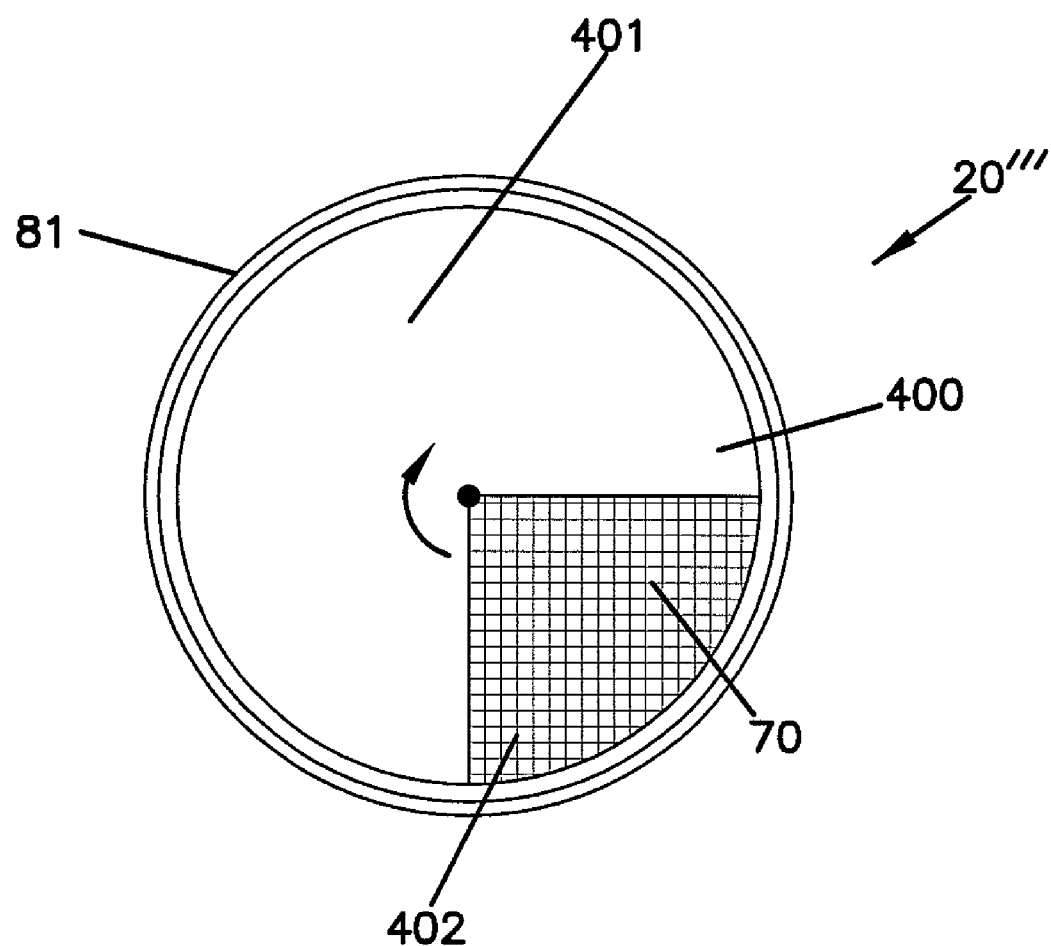
FIG. 22 is a cross-sectional view taken along section line 22-22 of FIG. 21.

FIGS. 21 and 22 show still another pulse cleaner 20" having features in accordance with the principles of the present disclosure. The pulse cleaner 20" has the same basic components and operates in the same general manner as the pulse cleaners 20, 20', but has been modified to include a pulse concentrator 400 located in the conduit 81 at a location immediately above where the DPF mounts within the cabinet. The pulse concentrator 400 is configured to direct (e.g., concentrate or focus) each pulse at a partial portion of the upper face of the DPF. For example, the pulse concentrator can be configured to focus each pulse at ½ of the face of the DPF, ⅓ of the face of the DPF, ¼ of the face of the DPF, or any other elected portion of the face of the DPF. As shown at FIG. 22, the flow concentrator is configured to focus the flow of each pulse at ¼ or quadrant of the DPF. Referring to FIG. 22, the flow concentrator includes a blocking portion 401 that covers a portion of the DPF so as to block flow from entering the covered portion and an open portion 402 that focuses the pulse flow at a partial portion of the filter. In a preferred embodiment, the blocked portion covers a majority of the face of the DPF. In the depicted embodiment, the blocking portion covers ¾ of the face of the DPF, while the open portion corresponds to one quarter of the DPF.

In use of the pulse concentrator 400, pulses are directed from the air pressure tank 60 down through the DPF in the same manner previously described with respect to the earlier embodiments. However, rather than each pulse impinging upon the entire top face of the DPF, the pulse concentrator 400 focuses each pulse at a first partial region or portion of the DPF. After a series of pulses pass through the partial region, the pulse concentrator 400 can be rotated so that the open portion aligns with a second partial portion of the DPF. A next series of pulses can then be directed through the second partial portion of the DPF. This process can be continued until the entire DPF has been cleaned. For example, in the depicted embodiment, the flow concentrator can be rotated in four 90 degree increments so that a series of pulses can be directed separately through each quadrant of the DPF.

Figure 25:
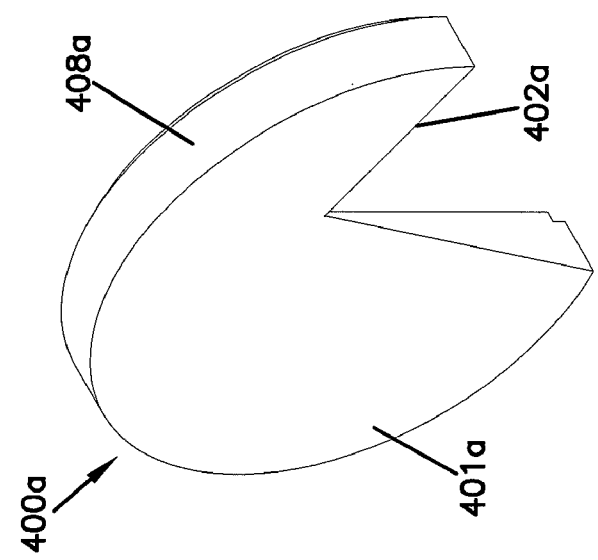
FIG. 25 is a perspective view of the flow concentrator of FIG. 23.
Figure 24:
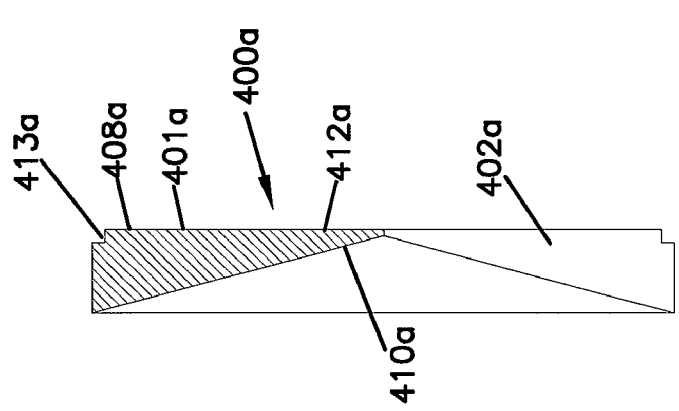
FIG. 24 is a cross-sectional view taken along section line 24-24 of FIG. 23.
Figure 23:
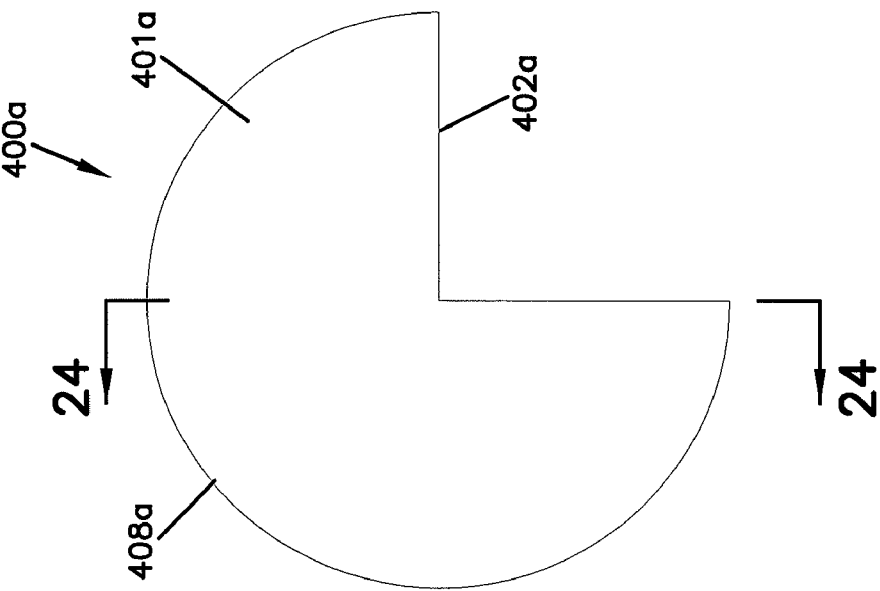
FIG. 23 is a top plan view of an example flow concentrator having inventive aspects in accordance with the principles of the present disclosure.

FIGS. 23-25 show and example concentrator 400a having inventive features in accordance with the principles of the present disclosure. The concentrator 400a has a body 408a defining a blocking portion 401a and an open portion 402a. The body 408a has a generally circular outer boundary and the open portion 402a is a ninety degree notch cut from the body 408a. A top side 410a of body defines a conical recess for directing flow toward the open portion 402a. A bottom side 412a of the body 408a defines a circumferential shoulder 413a adapted to seat on a corresponding shoulder provided within the conduit 81.

Figure 28:
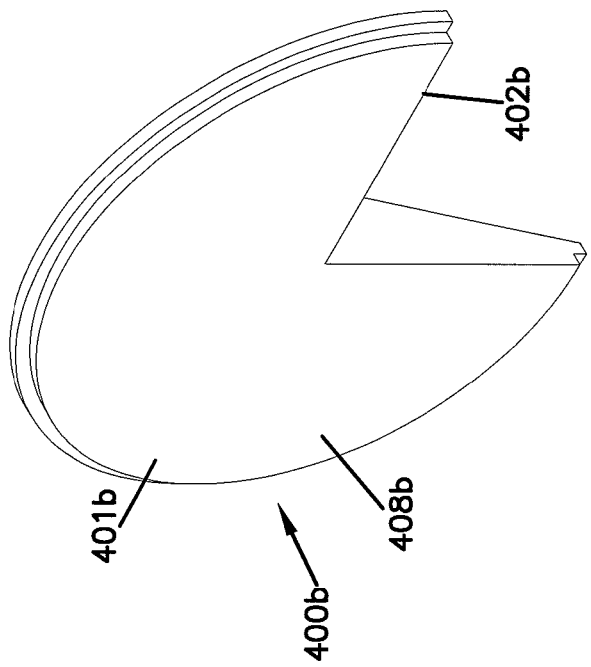
FIG. 28 is a perspective view of the flow concentrator of FIG. 26.
Figure 27:
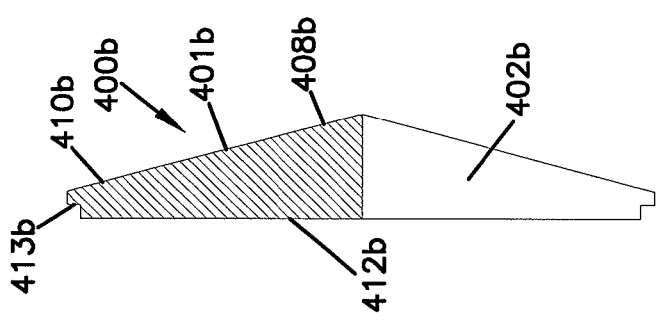
FIG. 27 is a cross-sectional view taken along section line 27-27 of FIG. 26.
Figure 26:
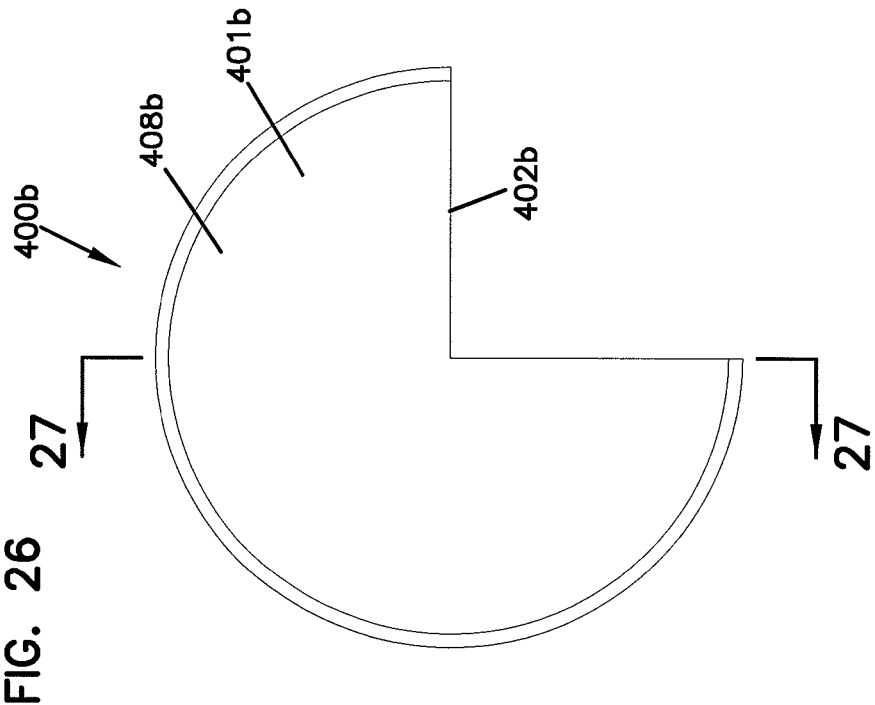
FIG. 26 is a bottom plan view of another example flow concentrator having inventive aspects in accordance with the principles of the present disclosure.

FIGS. 26-28 show and example concentrator 400b having inventive features in accordance with the principles of the present disclosure. The concentrator 400b has a body 408b defining a blocking portion 401b and an open portion 402b. The body 408b has a generally circular outer boundary and the open portion 402b is a ninety degree notch cut from the body 408b. A top side 410b of body defines a conical recess for directing flow toward the open portion 402b. A bottom side 412b of the body 408b defines a circumferential shoulder 413b adapted to seat on a corresponding shoulder provided within the conduit 81.

It will be appreciated that the pulse concentrator can include any number of mechanical mechanisms for causing rotation of the concentrator within the conduit 81. For example, a manual crank or other mechanism can be used to manually change the rotational position of the pulse concentrator. In alternative embodiments, a drive mechanism controlled by the system controller can automatically move the pulse concentrator to different rotational positions as part of a pulse cleaning sequence. In other embodiments, the pulse concentrator can work in combination with a swirl generator (e.g., vanes 350 of FIG. 17) that causes air to impart a lateral load on the pulse concentrator that causes the pulse concentrator to cause the concentrator to rotate or otherwise change positions.

It has been determined that for some severely plugged DPF's, a large amount of back pressure can develop above the DPF when a pulse impinges upon the top face of the DPF. These excessive pressures can at times break the seal that exists between the upper sealing cone 130 and the top side of the DPF. This allows a portion of the pulse to bypass the DPF. To prevent this from happening, for severely plugged DPF's, the upper sealing cone 130 can be replaced with a clamping arrangement. For example, the upper sealing cone 130 can be removed from the hose 133 by disconnecting the hose clamp 121 and sliding the upper sealing cone 130 from the hose 133. An adapter 500 (see FIGS. 29-31) that facilitates clamping can then be secured to the lower end of the hose 133 (e.g., strapped in place with the hose clamp). The adapter 500 includes a cylindrical upper portion 501 sized to fit within the hose 133 such that the hose can be clamped radially against the upper portion 501 by the hose clamp 121. In one embodiment, the adapter 500 has a metal construction. The adapter 500 also has a flange 502 that corresponds to an end flange of the DPF. The flange 502 has an end surface 503 adapted to abut against a similar sealing surface defined by the top end flange of the DPF. By clamping the adapter flange 502 to the top flange of the DPF (e.g., with a v-band clamp), a more secure and fluid tight connection can be provided between the hose 133 and the top end of the DPF. This assists in preventing portions of the pulses from bypassing the DPF.

It will also be appreciated that certain DPF configurations are not compatible with the shapes of either the upper or lower sealing cones 130, 132. For example, some DPF configurations include ends having truncated cones or neck portions that extend from the ends of the DPF's. To accommodate different types of DPF's, pulse cleaners in accordance with the principles of the present disclosure can include a number of different adapters that can be substituted for or used in combination with either of the upper of lower sealing cones 130, 132 to provide compatibility with different DPF styles.

Figure 34:
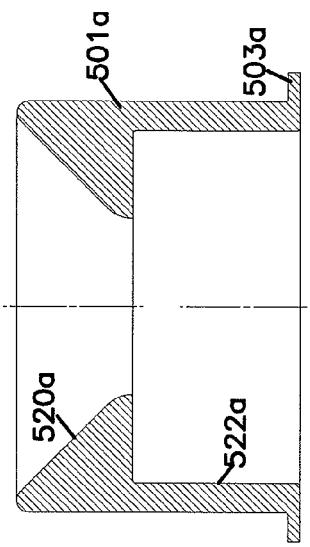
FIG. 34 is a cross-sectional view taken along section line 34-34 of FIG. 33.
Figure 32:
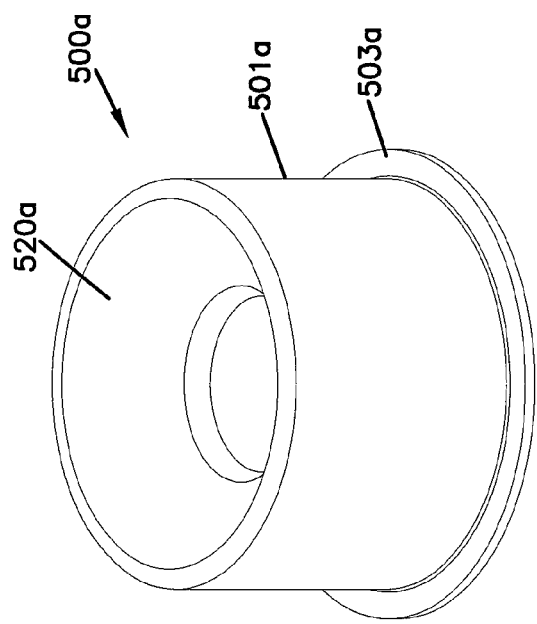
FIG. 32 is a perspective view of another exhaust treatment device mounting adapter having inventive aspects in accordance with the principles of the present disclosure.
Figure 33:
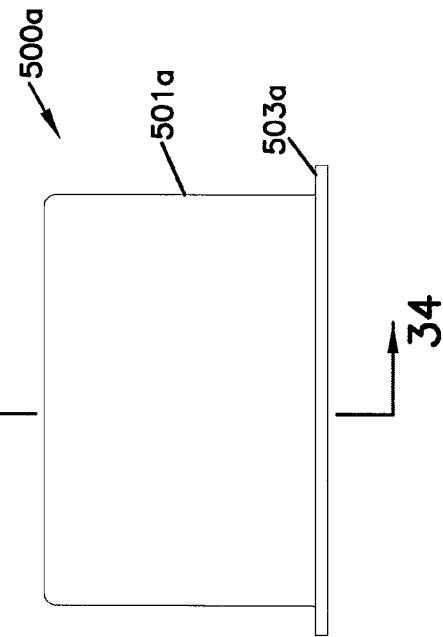
FIG. 33 is a side view of the adapter of FIG. 32.

FIGS. 32-34 show an adapter 500a that can be substituted for the upper sealing cone 130. The adapter 500a includes a cylindrical portion 501a sized to fit within the flexible hose 133 and held within the hose 133 by the hose clamp 121. The adapter 500a also includes an end flange 503a adapted to abut against the lower end of the flexible hose 133. The adapter 500a also includes a conical portion 520a for funneling air flow down through the adapter 500a, and a cylindrical receptacle 522a for receiving an upper end of the DPF.

FIGS. 35-37 show an adapter 500b that can be used at the lower sealing cone 132. The adapter 500b includes a conical portion 525b that nests within a corresponding conical depression of the lower sealing cone 132. The adapter 500b also includes a cylindrical portion 501b sized to fit through the center hole of the lower sealing cone 132 and into the flexible hose 144. The interior of the cylindrical portion 501b is sized to receive a neck portion of a DPF and a gasket 527b is provided for forming a seal with the lower end face of the neck portion. The adapter 500b further includes an extension 529b that fits within the neck portion of the DPF for assisting in centering the DPF.

Figure 38:
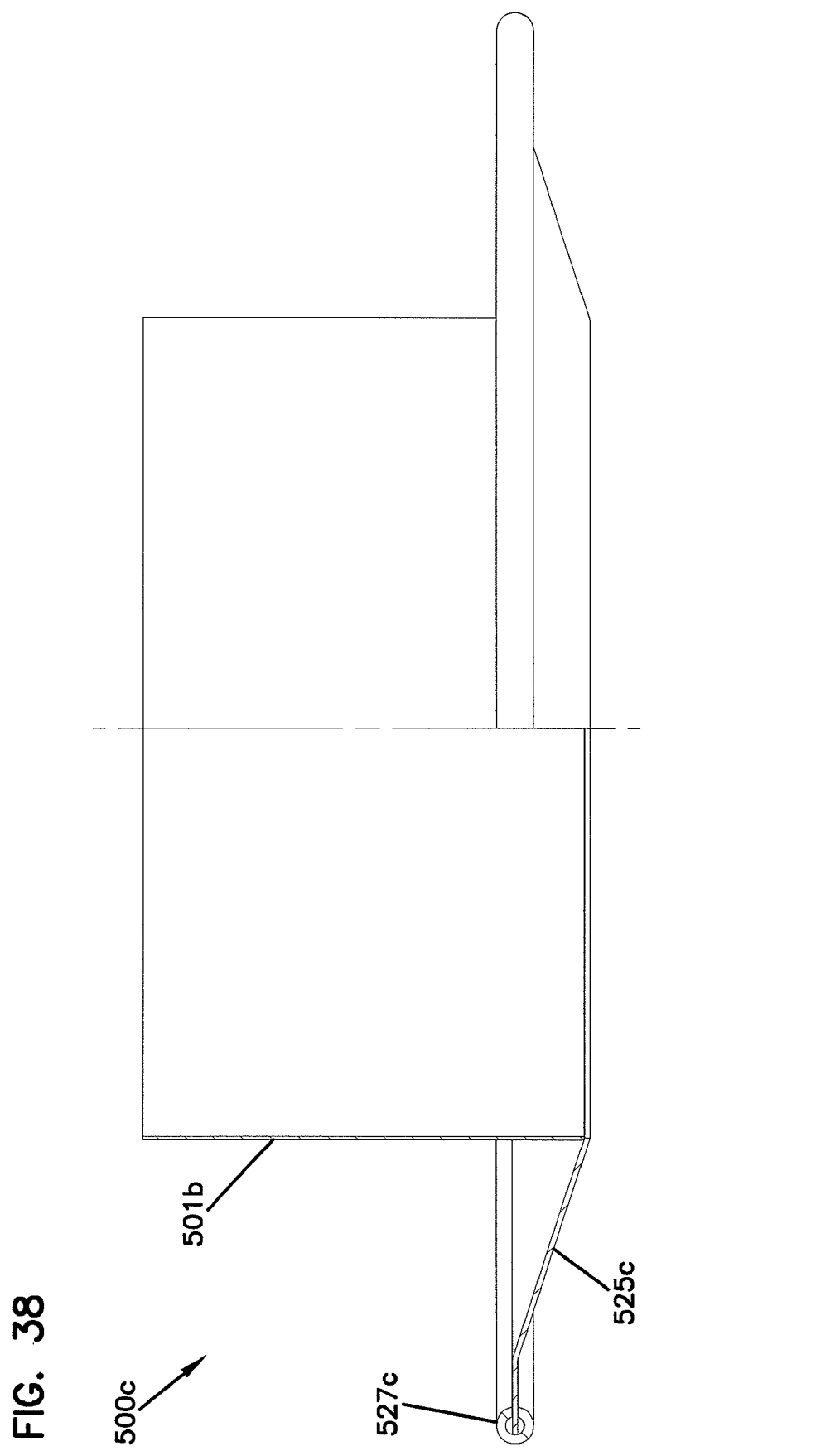
FIG. 38 shows an additional exhaust treatment device mounting adapter having inventive aspects in accordance with the principles of the present disclosure.

FIG. 38 shows an adapter 500c that can be used at the lower sealing cone 132. The adapter 500c includes a conical portion 525c that nests within a corresponding conical depression of the lower sealing cone 132. The adapter 500b also includes a cylindrical portion 501b sized to extend upwardly into a corresponding DPF. The adapter 500b further includes a gasket 527c that extends circumferentially around the perimeter of the adapter 500c and seats at a flat rim portion of the lower sealing cone 132. The gasket 527c is adapted to form a seal with an lower end face of a DPF.

The above specification provides examples of how certain inventive aspects may be put into practice. It will be appreciated that the inventive aspects can be practiced in other ways than those specifically shown and described herein without departing from the spirit and scope of the inventive aspects.

What is claimed is:

1. A cleaner for cleaning diesel exhaust aftertreatment devices, the cleaner comprising:
   a cabinet;
   a diesel exhaust aftertreatment device mount positioned within the cabinet for mounting the diesel exhaust aftertreatment device during cleaning;
   a collection filter positioned within the cabinet for collecting material displaced from the diesel exhaust aftertreatment device during cleaning;
   an air movement arrangement that blows air through the diesel exhaust aftertreatment device;
   a temperature sensing arrangement for sensing a temperature representative of a temperature of the diesel exhaust aftertreatment device; and
   a controller that interfaces with the temperature sensing arrangement and triggers an action if a sensed temperature exceeds a predetermined temperature level;
   wherein the cleaner is configured to clean the diesel exhaust treatment device without the use of a heat source.

2. The cleaner of claim 1, wherein the action includes activating a warning indication.

3. The cleaner of claim 1, wherein the action includes shutting down the cleaner.

4. The cleaner of claim 1, wherein the air movement arrangement includes a pulse generator for blowing pulses of air through the diesel exhaust aftertreatment device.

5. The cleaner of claim 4, further comprising a blower that blows air through the diesel exhaust aftertreatment device between the pulses of air.

6. The cleaner of claim 1, wherein the temperature sensing arrangement includes a temperature sensor that measures the air temperature of the air exiting the diesel exhaust aftertreatment device.

7. A cleaner for cleaning diesel exhaust aftertreatment devices, the cleaner comprising:
   a cabinet;
   a diesel exhaust aftertreatment device mount positioned within the cabinet for mounting the diesel exhaust aftertreatment device during cleaning;
   a collection filter positioned within the cabinet for collecting material displaced from the diesel exhaust aftertreatment device during cleaning;
   an air movement arrangement that blows air through the diesel exhaust aftertreatment device; and
   a vane located above the diesel exhaust aftertreatment device mount for causing the air to swirl prior to reaching the exhaust aftertreatment device.

8. A cleaner for cleaning diesel exhaust aftertreatment devices, the cleaner comprising:
   a cabinet;
   a diesel exhaust aftertreatment device mount positioned within the cabinet for mounting the diesel exhaust aftertreatment device during cleaning;
   a collection filter positioned within the cabinet for collecting material displaced from the diesel exhaust aftertreatment device during cleaning;
   an air movement arrangement that blows air through the diesel exhaust aftertreatment device; and
   a flow concentrator positioned above the diesel exhaust aftertreatment device mount for concentrating the air at only a portion of a face of the aftertreatment device, the flow concentrator including an air blocking portion for blocking the air and a non-blocking portion that allows air to pass through to diesel exhaust aftertreatment device.

9. A cleaner for cleaning diesel exhaust aftertreatment devices, the cleaner comprising:
   a cabinet;
   a diesel exhaust aftertreatment device mount positioned within the cabinet for mounting the diesel exhaust aftertreatment device during cleaning;
   a collection filter positioned within the cabinet for collecting material displaced from the diesel exhaust aftertreatment device during cleaning;
   an air movement arrangement that blows air through the diesel exhaust aftertreatment device; and
   a plurality of adapters for making the diesel exhaust aftertreatment device mount compatible with different styles of after treatment devices.

* * * * *